(12) United States Patent
Weidenfeller

(10) Patent No.: US 10,194,033 B2
(45) Date of Patent: Jan. 29, 2019

(54) CHARGING RECORD AUTHENTICATION FOR ANONYMIZED NETWORK SERVICE UTILIZATION

(71) Applicant: Telefonaktiebolaget LM Ericsson (publ), Stockholm (SE)

(72) Inventor: Thomas Weidenfeller, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/774,023

(22) PCT Filed: Nov. 24, 2015

(86) PCT No.: PCT/EP2015/077461
§ 371 (c)(1),
(2) Date: May 7, 2018

(87) PCT Pub. No.: WO2017/088908
PCT Pub. Date: Jun. 1, 2017

(65) Prior Publication Data
US 2018/0324307 A1    Nov. 8, 2018

(51) Int. Cl.
*H04M 15/00* (2006.01)
*H04W 12/04* (2009.01)
(Continued)

(52) U.S. Cl.
CPC ........... *H04M 15/41* (2013.01); *H04M 15/04* (2013.01); *H04M 15/48* (2013.01);
(Continued)

(58) Field of Classification Search
CPC ...... H04M 15/04; H04M 15/41; H04M 15/48; H04M 15/857; H04M 17/103; H04W 4/24; H04W 12/04; H04W 12/06
See application file for complete search history.

(56) References Cited

U.S. PATENT DOCUMENTS

2006/0265339 A1   11/2006   Vakil et al.
2008/0301785 A1*  12/2008   Beyer ..................... H04L 63/08
                                                          726/5
2016/0105792 A1*   4/2016   Mohammed .......... H04W 12/06
                                                          455/418

FOREIGN PATENT DOCUMENTS

WO   2009129856 A1   10/2009

OTHER PUBLICATIONS

3rd Generation Partnership Project, "3rd Generation Partnership Project; Technical Specification Group Services and System Aspects; Generic Authentication Architecture (GAA); Generic Bootstrapping Architecture (GBA) (Release 12)", Technical Specification, 3GPP TS 33.220 V12.3.0, Jun. 1, 2014, pp. 1-92, 3GPP, France.
(Continued)

*Primary Examiner* — Wayne H Cai
(74) *Attorney, Agent, or Firm* — Coats & Bennett, PLLC

(57) ABSTRACT

A user device (10) provides a subscriber with access to a network service. The user device (10) determines service-specific key material and charging-specific key material. The user device (10) determines a charging record indicating usage of the network service by the subscriber and associates the charging record with first authentication information based on the charging-specific key material. The user device (10) generates at least one message including the charging record and the associated first authentication information. The user device (10) associates the at least one message with second authentication information based on the service-specific key material. The user device (10) sends the at least one message to a first network node (150) which is incapable of relating the charging-specific key material or the service-specific key material to a subscriber identity of the subscriber. The first network node (150) receives the at least one message and the associated second authentication information from the user device (10) and authenticates the at least
(Continued)

one message based on the service-specific key material and the second authentication information. In response to authenticating the at least one message, the first network node forwards the charging record and the associated first authentication information to a second network node (120). The second network node (120) is capable of relating the charging-specific key material to the subscriber identity of the subscriber. The second network node (120) receives the charging record and the associated first authentication information from the first network node (150) and authenticates the charging record based on the charging-specific key material and the first authentication information. In response to authenticating the charging record, the second network node (120) controls charging of the network service.

26 Claims, 16 Drawing Sheets

(51) Int. Cl.
    *H04M 15/04*     (2006.01)
    *H04M 17/00*     (2006.01)
    *H04W 4/24*     (2018.01)
    *H04W 12/06*     (2009.01)

(52) U.S. Cl.
    CPC ....... *H04M 15/857* (2013.01); *H04M 17/103* (2013.01); *H04W 4/24* (2013.01); *H04W 12/04* (2013.01); *H04W 12/06* (2013.01)

(56) References Cited

OTHER PUBLICATIONS

3rd Generation Partnership Project, "3rd Generation Partnership Project; Technical Specification Group Services and System Aspects; Telecommunication management; Charging management; Charging architecture and principles (Release 11)", Technical Specification, 3GPP TS 32.240 V11.5.0, Sep. 1, 2012, pp. 1-44, 3GPP, France.
3rd Generation Partnership Project, "Digital cellular telecommunications system (Phase 2+); Universal Mobile Telecommunications System (UMTS); LTE; Telecommunication management; Charging management; Charging architecture and principles", Technical Specification (3GPP TS 32.240 version 12.6.0 Release 12), ETSI TS 132 240 V12.6.0, Jan. 1, 2015, pp. 1-58, ETSI.
3rd Generation Partnership Project, "3rd Generation Partnership Project; Technical Specification Group Services and System Aspects; Telecommunication management; Charging management; Charging principles (Release 5)", Technical Specification, 3GPP TS 32.200 V5.9.0, Sep. 1, 2005, pp. 1-89, 3GPP, France.
Niemi, A. et al., "Hypertext Transfer Protocol (HTTP) Digest Authentication Using Authentication and Key Agreement (AKA)", Network Working Group Request for Comments: 3310, Sep. 1, 2002, pp. 1-18, The Internet Society.
Franks, J. et al., "HTTP Authentication: Basic and Digest Access Authentication", Network Working Group Request for Comments: 2617, Jun. 1, 1999, pp. 1-34, The Internet Society.
3rd Generation Partnership Project, "3rd Generation Partnership Project; Technical Specification Group Services and System Aspects; Telecommunication management; Charging management; Diameter charging applications (Release 13)", Technical Specification, 3GPP TS 32.299 V13.2.0, Sep. 1, 2015, pp. 1-177, 3GPP, France.

* cited by examiner

CHARGING RECORD AUTHENTICATION FOR ANONYMIZED NETWORK SERVICE UTILIZATION

TECHNICAL FIELD

The present invention relates to methods for controlling utilization of a network service and to corresponding devices.

BACKGROUND

In communication networks, it is known to provide mechanisms for authenticating a subscriber. In mobile communication networks as specified by 3GPP ($3^{rd}$ Generation Partnership Project), it is for example known to base such mechanisms on associating a user equipment (UE), e.g., a mobile phone, with a SIM (Subscriber Identity Module). The SIM typically contains identity and security information which corresponds to identity and security information stored in the mobile communication network, e.g., in a HSS (Home Subscriber Server) or similar subscriber database. Such identity and security information is typically only accessible to network nodes operated by an operator the subscriber is subscribed to. For other network nodes access to the identity and security information is typically limited for security and privacy reasons. These mechanisms thus primarily aim at authenticating the subscriber within the communication network of the operator the subscriber is subscribed to.

Further, it is known to utilize such mechanism for authenticating the subscriber within the communication network also for authentication with respect to other services, e.g., $3^{rd}$ party network services not under control of the operator of the communication network. An example of a corresponding technology is the Generic Bootstrapping Architecture (GBA) as specified in 3GPP TS 33.220 V12.3.0 (2014 June).

The GBA technology provides a Bootstrapping Server Function (BSF) which typically is controlled by the operator of the mobile communication network. The BSF is connected to the operator's HSS and can be accessed by a $3^{rd}$ party offering a network service to a subscriber of the mobile communication network, in particular by a Network Application Function (NAF) operated by the $3^{rd}$ party. The BSF protects the HSS from direct access by the $3^{rd}$ party. The NAF authenticates the subscriber's UE with respect to messages from the subscriber's UE. Typically, these messages are generated by a certain application running on the UE to allow access to the offered network service, and the NAF authenticates these messages for the application. The NAF may thus act as a gatekeeper for the application, typically only allowing those messages to pass which could be authenticated, i.e., for which it could be verified that they originated from the subscriber's UE. These messages are typically based on the Hypertext Transfer Protocol (HTTP) and related web technologies, but other protocols or message types could be used as well.

In a typical GBA authentication procedure, when he UE first attempts to access the network service via the NAF by sending a HTTP request, the NAF indicates to the UE that GBA authentication is required by rejecting the request. The UE may then proceed to perform a GBA bootstrapping authentication procedure with the BSF. The bootstrapping authentication procedure with the BSF involves that the UE and the BSF first establish a mutual authentication between themselves first. On the UE side, the mutual authentication makes use of identity and security information stored in the SIM. On the BSF side, the mutual authentication makes use of identity and security information the BSF obtains from the HSS. The mutual authentication is performed by executing cryptographic algorithms both in the UE, probably with the help of the SIM, and the BSF. Based on the cryptographic algorithms, the UE and the BSF also agree on generic cryptographic key material, referred to as Ks. From this generic key material, the UE and the BSF derive further cryptographic key material, referred to as Ks_NAF. The Ks_NAF key material is then used by the UE and the NAF for message authentication when the UE again tries to access the network service via the NAF. The UE confirms authenticity of the message by associating it with authentication information based on the Ks_NAF key material, e.g., by adding authentication information derived via cryptographic algorithms from the Ks_NAF key material and an authentication challenge previously received in response to the failed attempt to access the network service.

Upon receiving the message, the NAF contacts the BSF to obtain the Ks_NAF key material from the BSF. Together with the Ks_NAF key material the BSF may optionally also provide an IP Multimedia Private Identity (IMPI) to the NAF. Based on the Ks_NAF key material and by performing corresponding algorithms as performed by the UE when authenticating the message the NAF can authenticate the message, i.e., verify authenticity of the message from the UE.

In the GBA authentication procedure, it is possible to keep anonymity of the UE with respect to the NAF and the $3^{rd}$ party operating the NAF. In this case, the NAF and the $3^{rd}$ party offering the network service would be aware that the subscriber is authenticated, but have no information about the subscriber's identity. This allows providing the network service in an anonymized manner, while still ensuring that the subscriber is actually entitled to use the network service. To achieve anonymity, the bootstrapping authentication procedure may be performed in such a way that the above-mentioned option that the BSF provides the IMPI to the NAF is not used. Further, the UE should not reveal the subscriber identity in the messages transmitted towards the NAF. This for example involves, that the UE does not send a "X-3GPP-Intended-Identity" HTTP header using its real identity. It should either refrain from sending that header or assume an unrelated alias. Of course, the UE should also refrain from sending any other kind of identifying information as part of the application protocol, e.g., a user name which can be traced back to the subscriber identity.

However, when providing the network service in an anonymized manner as outlined above, there is no straightforward way for the provider of the network service to charge the subscriber for usage of the network service: Because the service provide cannot identify the subscriber, the service provider is not able to pinpoint charges to the subscriber. While the BSF is aware of the identity of the subscriber, it is in turn not aware of the subscriber's usage of the network service. The BSF merely knows that a GBA authentication procedure was performed for the subscriber. However, this information, even if provided to the $3^{rd}$ party service provider, may be insufficient for charging since it does not indicate that the subscriber actually used the network service or to what extent the network service was used, e.g., in terms of duration, data volume, or service level.

Accordingly, there is a need for techniques which allow for efficiently performing charging of a network service provided in an anonymized manner.

SUMMARY

According to an embodiment of the invention, a method of controlling utilization of a network service is provided. According to the method, a user device provides a subscriber with access to a network service. Further, the user device determines service-specific key material. Further, the user device determines charging-specific key material. The user device determines a charging record indicating usage of the network service by the subscriber. The user device associates the charging record with first authentication information based on the charging-specific key material. Further, the user device generates at least one message comprising the charging record and the associated first authentication information. The user device associates the at least one message with second authentication information based on the service-specific key material. Further, the user device sends the at least one message and the associated second authentication information to a network node which is incapable of relating any of the charging-specific key material and the service-specific key material to a subscriber identity of the subscriber.

According to a further embodiment of the invention, a method of controlling utilization of a network service is provided. According to the method, a network node provides access to a network service through a user device connected to the network node. Further, the network node receives at least one message and first authentication information associated with the at least one message from the user device. The first authentication information is based on service-specific key material. The at least one message comprises a charging record and second authentication information associated with the charging record. The charging record indicates usage of the network service by a subscriber. The second authentication information is based on charging-specific key material. The network node is incapable of relating any of the charging-specific key material and the service-specific key material to a subscriber identity of the subscriber. Based on the service-specific key material and the first authentication information, the network node authenticates the at least one message. In response to authenticating the at least one message, the network node forwards the charging record and the associated second authentication information to a further network node which is capable of relating the charging-specific key material to a subscriber identity of the subscriber.

According to a further embodiment of the invention, a method of controlling utilization of a network service is provided. According to the method, a network node determines charging-specific key material related to a subscriber. Further, the network node receives a charging record and authentication information associated with the charging record from a further network node. The charging record indicates usage of a network service by the subscriber. The authentication information is based on the charging-specific key material. The further network node is incapable of relating the charging-specific key material to a subscriber identity of the subscriber. Based on the charging-specific key material and the authentication information, the network node authenticates the charging record. In response to authenticating the charging record, the network node controls charging of the network service.

According to a further embodiment of the invention, a user device is provided. The user device is configured to provide a subscriber with access to a network service. Further, the user device is configured to determine service-specific key material. Further, the user device is configured to determine charging-specific key material. Further, the user device is configured to determine a charging record indicating usage of the network service by the subscriber. Further, the user device is configured to associate the charging record with first authentication information based on the charging-specific key material. Further, the user device is configured to generate at least one message comprising the charging record and the associated first authentication information. Further, the user device is configured to associate the at least one message with second authentication information based on the service-specific key material. Further, the user device is configured to send the at least one message and the associated second authentication information to a network node which is incapable of relating any of the charging-specific key material and the service-specific key material to a subscriber identity of the subscriber.

According to a further embodiment of the invention, a network node is provided. The network node is configured to provide access to a network service through a user device connected to the network node. Further, the network node is configured to receive at least one message and first authentication information associated with the at least one message from the user device. The first authentication information is based on service-specific key material. The at least one message comprises a charging record and second authentication information associated with the charging record. The charging record indicates usage of the network service by a subscriber. The second authentication information is based on charging-specific key material. The network node is incapable of relating any of the charging-specific key material and the service-specific key material to a subscriber identity of the subscriber. Further, the network node is configured to authenticate the at least one message based on the service-specific key material and the first authentication information. Further, the network node is configured to, in response to authenticating the at least one message, forward the charging record and the associated second authentication information to a further network node which is capable of relating the charging-specific key material to the subscriber identity of the subscriber.

According to a further embodiment of the invention, a network node is provided. The network node is configured to determine charging-specific key material related to a subscriber. Further, the network node is configured to receive, from a further network node, a charging record and authentication information associated with the charging record. The charging record indicates usage of a network service by the subscriber. The authentication information is based on the charging-specific key material. The further network node is incapable of relating the charging-specific key material to a subscriber identity of the subscriber. Further, the network node is configured to authenticate the charging record based on the charging-specific key material and the authentication information. Further, the network node is configured to, in response to authenticating the charging record, control charging of the network service.

According to a further embodiment of the invention, a system is provided. The system comprises a user device, a first network node, and a second network node. The user device is configured to provide a subscriber with access to a network service. Further, the user device is configured to determine service-specific key material. Further, the user device is configured to determine charging-specific key material. Further, the user device is configured to determine a charging record indicating usage of the network service by the subscriber. Further, the user device is configured to associate the charging record with first authentication information based on the charging-specific key material. Further, the user device is configured to generate at least one message comprising the charging record and the associated first authentication information. Further, the user device is configured to associate the at least one message with second authentication information based on the service-specific key material. Further, the user device is configured to send the at least one message and the associated second authentication information to the first network node. The first network node is incapable of relating any of the charging-specific key material and the service-specific key material to a subscriber identity of the subscriber. The first network node is configured to receive the at least one message and the associated second authentication information from the user device. Further, the first network node is configured to authenticate the at least one message based on the service-specific key material and the second authentication information. Further, the first network node is configured to, in response to authenticating the at least one message, forward the charging record and the associated first authentication information to the second network node. The second network node is capable of relating the charging-specific key material to the subscriber identity of the subscriber. The second network node is configured to receive the charging record and the associated first authentication information from the first network node. Further, the second network node is configured to authenticate the charging record based on the charging-specific key material and the second authentication information. Further, the second network node is configured to, in response to authenticating the charging record, control charging of the network service.

According to a further embodiment of the invention, a computer program or computer program product is provided, e.g., in the form of a non-transitory storage medium, which comprises program code to be executed by at least one processor of a user device. Execution of the program code causes the user device to provide a subscriber with access to a network service. Further, execution of the program code causes the user device to determine service-specific key material. Further, execution of the program code causes the user device to determine charging-specific key material. Further, execution of the program code causes the user device to determine a charging record indicating usage of the network service by the subscriber. Further, execution of the program code causes the user device to associate the charging record with first authentication information based on the charging-specific key material. Further, execution of the program code causes the user device to generate at least one message comprising the charging record and the associated first authentication information. Further, execution of the program code causes the user device to associate the at least one message with second authentication information based on the service-specific key material. Further, execution of the program code causes the user device to send the at least one message and the associated second authentication information to a network node which is incapable of relating any of the charging-specific key material and the service-specific key material to a subscriber identity of the subscriber.

According to a further embodiment of the invention, a computer program or computer program product is provided, e.g., in the form of a non-transitory storage medium, which comprises program code to be executed by at least one processor of a network node. Execution of the program code causes the network node to provide access to a network service through a user device connected to the network node. Further, execution of the program code causes the network node to receive at least one message and first authentication information associated with the at least one message from the user device. The at least one message comprises a charging record and second authentication information associated with the charging record. The charging record indicates usage of the network service by a subscriber. The second authentication information is based on charging-specific key material. The network node is incapable of relating any of the charging-specific key material and the service-specific key material to a subscriber identity of the subscriber. Further, execution of the program code causes the network node to authenticate the at least one message based on the service-specific key material and the first authentication information. Further, execution of the program code causes the network node to, in response to authenticating the at least one message, forward the charging record and the associated second authentication information to a further network node which is capable of relating the charging-specific key material to the subscriber identity of the subscriber.

According to a further embodiment of the invention, a computer program or computer program product is provided, e.g., in the form of a non-transitory storage medium, which comprises program code to be executed by at least one processor of a network node. Execution of the program code causes the network node to determine charging-specific key material related to a subscriber. Further, execution of the program code causes the network node to receive, from a further network node, a charging record and authentication information associated with the charging record. The charging record indicates usage of a network service by the subscriber. The authentication information is based on the charging-specific key material. The further network node is incapable of relating the charging-specific key material to a subscriber identity of the subscriber. Further, execution of the program code causes the network node to authenticate the charging record based on the charging-specific key material and the authentication information. Further, execution of the program code causes the network node to, in response to authenticating the charging record, control charging of the network service.

Details of such embodiments and further embodiments will be apparent from the following detailed description of embodiments.

DETAILED DESCRIPTION OF EMBODIMENTS

Figure 1:
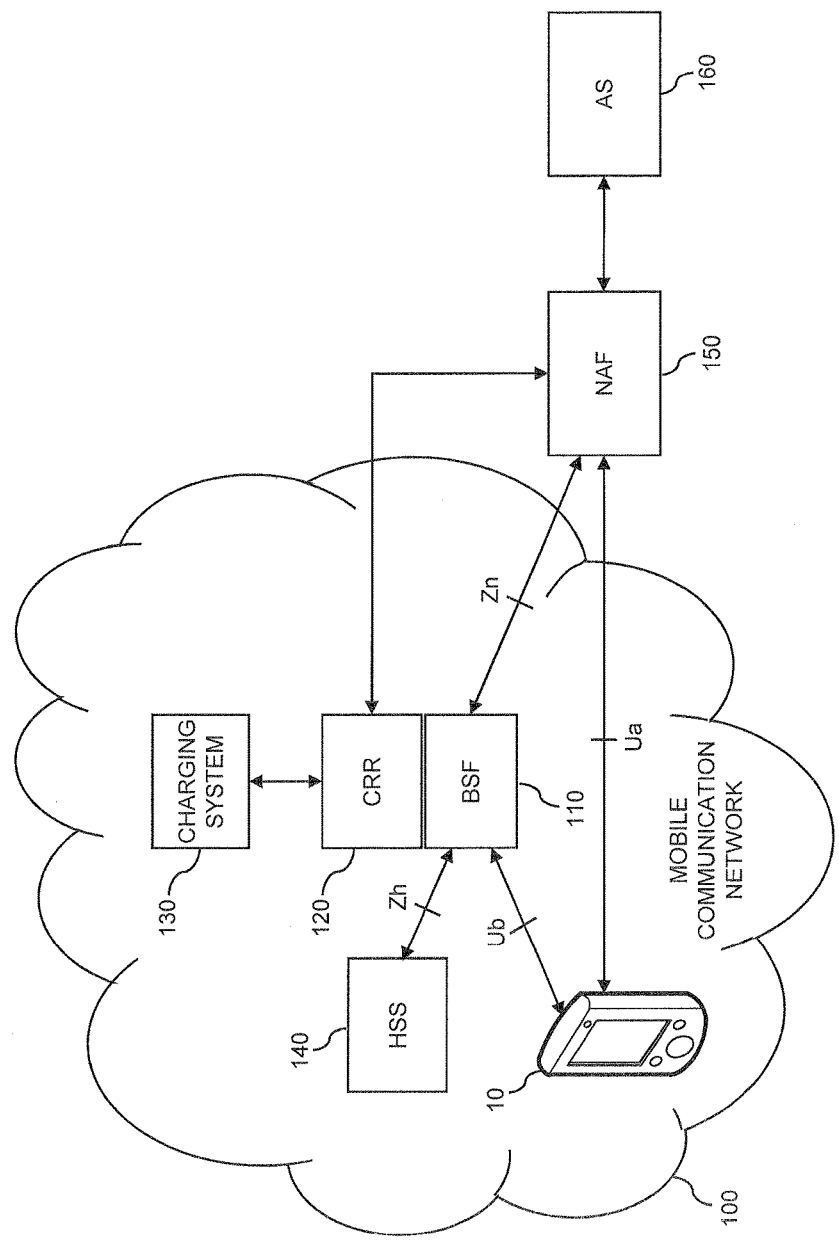
FIG. 1 schematically illustrates a communication network environment according to an embodiment of the invention.

In the following, concepts in accordance with exemplary embodiments of the invention will be explained in more detail and with reference to the accompanying drawings. The illustrated embodiments relate to control of utilization of a network service in a communication network. In the examples as further illustrated below, it will be assumed that the communication network is a mobile communication network as specified by 3GPP, and that a subscriber of the mobile communication network accesses the network service through a UE, e.g., a mobile phone or other kind of computer device with connectivity to the mobile communication network. However, it is to be understood that the illustrated concepts may also be applied in other kinds of communication networks and/or in connection with other kinds of user devices.

In the illustrated concepts, it is assumed that a network node, to which the UE is connected, controls access to the network service. For example, this network node may receive messages carrying user traffic of the network service from the UE or send messages carrying user traffic of the network service to the UE. The network node may forward the messages received from the UE to another network node, e.g., to an application server which executes an application through which the network service is provided. A corresponding application may be executed by the UE. Similarly, the network node may forward messages carrying user traffic of the network service from the application server to the UE. The network node is assumed to be capable of authenticating the messages received from the UE, i.e., of verifying authenticity of the message. This may be accomplished with the purpose of authorizing usage of the network service by the subscriber. The authentication is assumed to be accomplished in an anonymized manner. That is to say, it is assumed that the network node is incapable of deducing a subscriber identity, e.g., an IMPI of the UE, from information used in the authentication procedure. For example, this may be achieved by denying access of the network node to the subscriber identity and/or by performing the authentication procedure in such a way that the subscriber identity for information from which the subscriber identity can be derived are not provided to the network node.

To enable charging the network service, authentication of charging records is used. For authenticating the charging records, other key material is used than for authenticating the messages to the network node. Specifically, while service-specific key material is used for authenticating the messages to the network node, charging-specific key material is used for authenticating the charging records. Accordingly, when the UE determines usage of the network service, it determines a corresponding charging record and associates the charging record with authentication information based on the charging-specific key material. The UE then includes the charging record and the associated authentication information into a message to the network node. The charging record and the authentication information may be included into the same message. For example, the authentication information could be included in a header section of the message, and the charging record could be included in a payload section of the message. Further, both the authentication information and the charging record could be included in a payload section of the message. In some scenarios, it is also possible to include the charging record and the associated authentication information into different messages. The association of the authentication information to the charging record could then, for example, be established by using a hash function of the charging record as a basis for generating the authentication information. The UE then associates the at least one message with further authentication information based on the service-specific key material. Upon receiving the message, the network node can authenticate the message based on the authentication information associated therewith and the service-specific key material. However, since the network node is not aware of the subscriber identity, it cannot relate the at least one message, the authentication information associated with the at least one message, the service-specific key material, the charging record, the authentication information associated with the charging record, or the charging-specific key material to the subscriber identity. If the at least one message is authenticated, the network node forwards the charging record and authentication information associated therewith to a further network node, which is capable of relating the charging record, specifically the charging-specific key material used for authenticating the charging record, to the subscriber identity. This further network node will in the following also be referred to as charging record receiver (CRR). The further network node may then control charging of the network service, e.g., by interacting with a charging system of the mobile communication network. For example, the further network node may send an indication to the charging system that the subscriber associated with the subscriber identity is to be charged. The amount to be charged may depend on information included in the charging record. Further, the further network node may also provide information concerning authorization of charging to the network node. For example, if interaction with the charging system revealed that charging is unauthorized for this subscriber, e.g., due to the subscriber being out of quota, the further network node may indicate to the network node that charging is unauthorized. The network node may then react by denying the access to the network service and/or by sending a response to the UE which indicates that charging or usage of the network service is unauthorized.

Accordingly, in the illustrated concepts two stages of authentication using different key material are used. Since the network node does not need to use the charging-specific key material in the authentication procedure, a need to provide the network node with information from which the subscriber identity could be derived can be avoided.

The concept as outlined above, may for example be implemented based on the GBA technology as specified in 3GPP TS 33.220 V12.3.0 (2014 June). An example of a corresponding scenario is illustrated in FIG. 1. Specifically, FIG. 1 shows GBA infrastructure, which includes a BSF 110 and a NAF 150. As illustrated, the BSF 110 is part of the infrastructure of a mobile communication network 100, whereas the NAF 150 is not part of the mobile communication network 100. For example, the NAF 150 may be connected to the mobile communication network 100 through the Internet. In the illustrated example, the NAF 150 is connected to an application server (AS) 160 which runs an application providing a network service. In addition, FIG. 1 shows a UE 10 connected to the mobile communication network 100 and further infrastructure of the mobile communication network 100, in particular a CRR 120, a charging system 130, and an HSS 140. The CRR 120 may be implemented as an extension of the BSF 110, as an extension of the charging system 130, or as a separate element. In accordance with the GBA technology specified by 3GPP TS 33.220, an interface referred to as Ua connects the UE 10 to the NAF 150, and an interface referred to as Ub connects the UE 10 to the BSF 110. Further, an interface referred to as Zn connects the BSF 110 to the NAF 150, and an interface referred to as Zh connects the BSF 110 to the HSS 140.

In the scenario of FIG. 1, the NAF 150 corresponds to the above-mentioned network node, and the CRR 120 corresponds to the above-mentioned further network node or CRR. Further, the above-mentioned network node service-specific key material may correspond to Ks_NAF key material as used in the GBA technology.

In the scenario of FIG. 1, the UE 10 and the NAF 150 may obtain the service-specific key material, i.e., the Ks_NAF key material, in a GBA bootstrapping authentication procedure through interaction with the BSF 110, e.g., based on deriving the Ks_NAF key material from generic Ks key material. In the algorithm for deriving the Ks_NAF key material, the identity of the network service to which the Ks_NAF key material applies may be used as a parameter, which means that the Ks_NAF key material is service specific and the Ks_NAF key material cannot be re-used for another network service. A successfully verified authentication with particular Ks_NAF key material not only verifies that subscriber is authenticated, but also verifies authentication for the specific network service. As described in 3GPP TS 33.220, the Ks_NAF key material typically has an expiration date, essentially indicating until when an authentication based on that key material shall be considered valid. Once the Ks_NAF key material expires the NAF 150 denies access to the network service and the UE 10 has to repeat the GBA bootstrapping authentication procedure to obtain new, valid Ks_NAF key material. The Ks_NAF key material is identified by a Bootstrapping Transaction Identifier (B-TID). The B-TID is a temporary identifier generated by the BSF 110 for every set of Ks_NAF key material. It is valid as long as the Ks_NAF key material is valid. If new Ks_NAF key material is bootstrapped a new B-TID is assigned by the BSF 110.

The UE 10 and the CRR 120 may derive the charging-specific key material from the Ks_NAF key material, the subscriber identity, in particular the IMPI, and optionally other parameters.

However, other ways of deriving the charging-specific key material may be utilized as well. In the following the charging-specific key material will also be referred to as Ks_X key material. For deriving the Ks_X key material, various existing algorithms may be applied, e.g., a similar algorithm or key deviation function (KDF) as used in the GBA technology to derive the Ks_NAF key material from the generic Ks key material. However, other cryptographic algorithms could be used as well. The UE 10 then uses the Ks_X key material to determine authentication information for authentication of a charging record indicating usage of the network service provided by the AS 160 (through the NAF 150). The charging record may provide confirmation that the subscriber is willing to bear the charges for the network service. The UE 10 may determine the charging record and authentication information for the charging record upon request, e.g., by the NAF 150, or proactively, e.g., in response to locally detecting a triggering event, such as start or end of usage of the network service. By associating the charging record with the authentication information, the UE 10 confirms usage of the network service.

The charging record is assumed to be a set of data which can have various formats and content. In some cases, no specific content needs to be provided in the charging record. For example, merely the existence of an empty charging record can in some cases be sufficient to perform charging. For example, such an empty charging record may trigger charging of a certain predefined amount. In other cases, the charging record may include more detailed information, e.g., information about service usage, like duration, start and end times, data volume, service level, service name, monetary values, usage duration, or the like. In some scenarios, such empty charging record may also correspond to only the authentication information based on the charging-specific key material, e.g., a digital signature or a digest response. This authentication information could then be interpreted as a charging record by the CRR 120. In some cases, the charging record may also include the B-TID. In some scenarios, the content of the charging record may be chosen in such a way that mapping/conversion of the content to charging data as utilized in the mobile communication network 100 is simplified. In the case of a mobile communication network as specified by 3GPP, the content of the charging record could for example be adapted to conform to or allow easy conversion to charging data in line with a charging architecture as specified in 3GPP TS 32.200 V5.9.0 (2005 September) and 3GPP TS 32.240 V12.6.0 (2014 December), e.g., charging data as described in 3GPP TS 32.299 V13.2.0 (2015 September).

The determination of the charging record may be implemented in various ways. For example, a charging record can be created at regular time intervals, only once, or a fixed amount of times during service usage, at the end of usage of the network service, at the beginning of usage of the network service, or the like. The charging record can be created by the UE 10. Alternatively, the charging record can be created first by the NAF 150 or the application server 160 and then be sent to the UE 10 to be modified or just authenticated. Further, a request to create a charging record can be sent by the NAF 150 or the application to the UE 10. Further, the UE 10 could request from the NAF 150 or application server 160 to create a charging record, which is then sent for authentication and optionally modification to the UE 10. In some scenarios, the UE 10 may create, authenticate and send a charging record every time after it has successfully performed GBA bootstrapping authentication, i.e., every time it has obtained new Ks_NAF key material for accessing the network service.

If the UE 10 received the charging record from another entity, the UE 10 may also check if the content of the charging record matches charging data recorded by the UE 10. For example if duration of service usage and/or data volume as measured by the UE 10 are consistent with the content of the charging record.

The inclusion of the IMPI (or any other identity information) in the derivation of the Ks_X key material ensures that only those entities with knowledge of the IMPI (or other identifying information), can derive the same Ks_X key material. In the illustrated scenario, these elements are the UE 10, the BSF 110, and the CRR 120, but not the NAF 150, the application server 160, or any other entity controlled by a $3^{rd}$ party. By using Ks_X key material derived from the Ks_NAF key material and the IMPI, it can thus be ensured that only entities with access to the Ks_NAF key material and the IMPI can achieve successful authentication of the charging record. In scenario of FIG. 1, these entities are the BSF 110, the CRR 120, which are nodes under control of the operator of the mobile communication network, and the UE 10. While the NAF 150 knows the Ks_NAF key material, it does not know the IMPI.

The UE 10 then sends the charging record and the associated authentication information via the Ua interface to the NAF 150. For this purpose, the UE 10 includes the charging record into a message to the NAF 150 which is associated with authentication information based on the Ks_NAF key material. This message not only includes the charging record and associated authentication information, but also the B-TID assigned by the BSF 110 in the GBA bootstrapping authentication procedure for providing the Ks_NAF key material. Again, this may be accomplished proactively or on request.

Upon receiving the message from the UE 10, the NAF 150 authenticates the message, which is accomplished based on the Ks_NAF key material and the authentication information associated with the message. If the message is authenticated, the NAF 150 continues with the processing of the message. Otherwise, the message can be discarded and also provision of the network service denied or discontinued. In the present case, the processing of the message by the NAF 150 includes (but is not limited to) extracting the charging record and associated authentication information and forwarding the charging record and associated authentication information to the CRR 120. For this purpose, the NAF 150 may include the charging record and associated authentication information into a message to the CRR 120. In the illustrated example, it is assumed that this message not only includes the charging record and associated authentication information, but also the B-TID assigned by the BSF 110 in the GBA bootstrapping authentication procedure for providing the Ks_NAF key material. The NAF 150 may also check the charging record for consistency. For example, if the NAF 150 sent the charging record to the UE 10 for authentication, the NAF 150 may check if the charging record is unaltered, or if only permitted modifications were done. Further, if the charging record was created by the UE 10, the NAF 150 may check if the content of the charging record is consistent with charging data as measured by the NAF 150, e.g., measured data volume, duration of service usage, or the like.

It is noted that in some scenarios also multiple messages could be used for conveying the charging record and its associated authentication information to the NAF 150. For example, one message could include the charging record, and a further message could include the authentication information associated with the charging record. The association of the charging record and the authentication information could then for example be established by established by using a hash function of the charging record as input for determining the authentication information.

Upon receiving the message from the NAF 150, the CRR 120 uses the Ks_X key material and the authentication information associated with the charging record to authenticate the charging record, i.e., to verify if authenticity of the charging record was properly confirmed by the UE 10.

If the CRR 120 was able to authenticate the charging record, it triggers charging of a corresponding amount to the subscriber, e.g., by sending a charging event indication to the charging system. Since the CRR 120 is aware of the subscriber identity, e.g., IMPI, from the process of obtaining the Ks_X key material through interaction with the BSF 110, it can relate the charging record to the subscriber, e.g., through the B-TID transmitted together with the charging record and the corresponding IMPI. Further the CRR 120 may proactively or on request confirm to the NAF 150 (and thus indirectly also the application server 160 or service provider of the network service) that the charging record could be authenticated and/or charging of the network service is authorized for the subscriber. The CRR 120 may digitally sign or otherwise confirm authenticity of this confirmation. The NAF 150, the application server 160 or some other entity controlled by the service provider may keep record of the received confirmations of information included in the charging records sent towards the CRR 120, e.g., to have a proof of money the operator of the mobile communication network owes to the service provider. For example, the NAF 150 or some other entity controlled by the service provider may store such information in a database for charging purposes. The NAF 150 may also utilize the confirmations received from the CRR 120 for controlling provisioning of the network service. For example, if authentication of the charging record for authorization of charging is positively confirmed, the NAF 150 may continue with provisioning the network service, e.g., by forwarding application-level messages from the UE 10 to the application server 160 and/or by forwarding application-level messages from the application server 160 to the UE 10. Further, if a failure of authenticating the charging record and/or charging of the network service being unauthorized is indicated, the NAF 150 may stop provisioning the network service, e.g., by blocking application-level messages from the UE 10 or the application server 160 and/or by sending a failure indication to the UE 10.

As explained, the NAF 150 or any other entity controlled by a $3^{rd}$ party will not be able to obtain the Ks_X key material required for authentication of the charging record. This in turn means the CRR 120 can be sure that the authentication information associated with the charging record originates from the UE 10. The NAF 150 in turn can be sure it received the charging record from the correct subscriber, because the charging record was received in a message properly authenticated based on the Ks_NAF key material.

As mentioned above, the CRR 120 could be provided as an extension to the BSF 110, which may allow for simplifying the resulting architecture, because no separate interface between the NAF 150 and the CRR 120 needs to be established. Rather, in such case the Zn interface could be enhanced to support the communication between the NAF 150 and the CRR 120 as further detailed below. For example, existing messages as supported on the Zn interface could be enhanced to also carry the charging record. Further, communication between the NAF 150 and the CRR 120 could be secured in an efficient manner by reusing existing mechanisms as specified for the Zn interface. Further, the obtaining of Ks_NAF key material for a B-TID from the BSF 110 could be combined with the transmission of the charging record and response to the transmission of the charging record. When providing the CRR as a separate element, dedicated interfaces may be provided for supporting the communication between the NAF 150 and the CRR 120 and also between the BSF 110 and the CRR 120.

Figure 2:
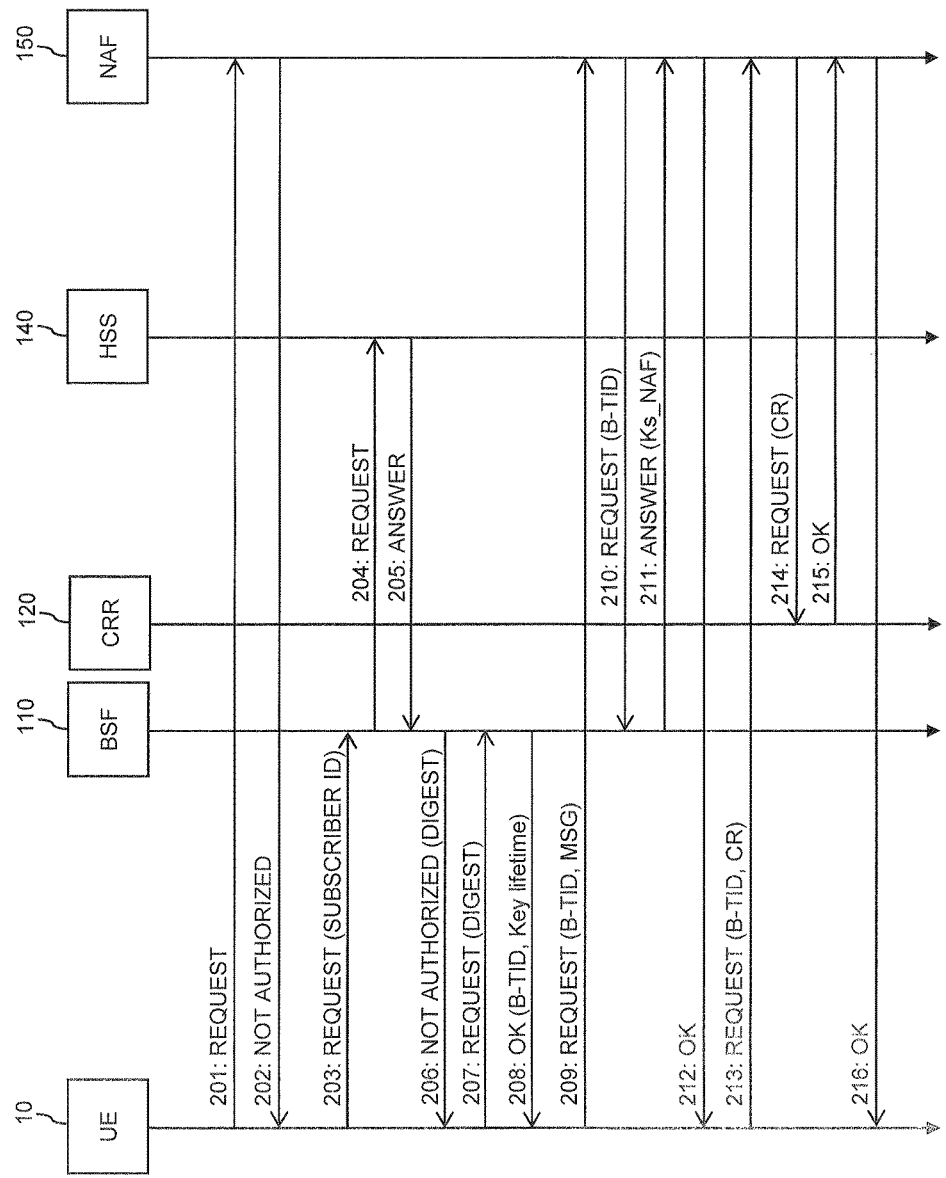
FIG. 2 shows a signaling diagram for illustrating procedures according to an embodiment of the invention.

FIG. 2 shows an example of procedures which are based on the concepts as described above. The procedures of FIG. 2 involve the UE 10, the BSF 110, the CRR 120, the HSS 140, and the NAF 150. The procedures of FIG. 2 may for example be performed when the subscriber starts using the network service through the UE 10 and the NAF 150.

In the procedures of FIG. 2, the UE 10 initially sends a request 201 to the NAF 150. The request 201 may for example have the purpose of initiating a session of the network service.

In the illustrated scenario, the NAF 150 response to the request to one with a response 202 indicating that usage of the service is not authorized and GBA bootstrapping authentication is required.

The UE 10 then initiates GBA bootstrapping authentication by sending a request 203 to the BSF 110. The request 203 includes the subscriber identity, in particular the IMPI, of the subscriber. Upon receiving the request 203, the BSF 110 interacts with the HSS 140 in order to obtain subscriber and security information needed in the GBA bootstrapping authentication procedure. In the illustrated example, this interaction involves that the BSF 110 sends a request 204 to the HSS 140 and receives an answer 205 from the HSS 140. The request 204 may for example correspond to a Multimedia Auth Request indicating the IMPI, and the answer 205 may for example correspond to a Multimedia Auth Answer as mentioned in 3GPP TS 33.220.

The BSF 110 then sends a response 206 to the UE 10, indicating that the request 203 is unauthorized and digest authentication with the BSF 110 is required. As for example described in 3GPP TS 33.220, the response 206 may include a WWW-Authenticate header with parameters as specified in RFC 2617 (June 1999), for example, with the extensions as described in RFC 3310 (December 2002). The response 206 may in particular include a Digest-challenge, for example, using the authentication and key agreement (AKA) one-time password generation mechanism. Based on security information stored in the UE 10, e.g., as provided by a SIM of the UE 10, and data received in the Digest-challenge the UE 10 calculates a Digest-response. It further calculates the Ks key material from data provided by the SIM and the data received in the Digest-challenge.

The UE 10 includes the Digest-response into a further request 207 to the BSF 110. In this case, the BSF 110 is able to authenticate the UE 10 based on the information included in the request 207 and sends an affirmative response 208 to the UE 10. The response 208 includes the B-TID for this GBA bootstrapping authentication and typically also a lifetime of the key material derived in this GBA bootstrapping procedure. Using the Ks material, the UE 10 can then derive the Ks_NAF key material and use this for authenticating a next request 209 to the NAF 150. At this point, the UE 10 can also derive the Ks_X key material to be used for authenticating charging records generated by the UE 10.

The request 209 includes the B-TID received from the BSF 110. As illustrated, the request 209 may further include an application-level message (MSG) destined to the application server 160 (not illustrated in FIG. 2).

Upon receiving the request 209, the NAF 150 uses the be B-TID to obtain the Ks_NAF key material from the BSF 110. For this purpose, the NAF 150 sends a request 210 indicating the B-TID to the BSF 110, which responds with an answer 211 indicating the Ks_NAF key material. In order to ensure anonymity, the BSF 110 is configured in such a way that the answer 211 does not include the IMPI of the UE 10 or any other information from which the subscriber identity could be derived. Using this Ks_NAF key material, the NAF 150 can then authenticate the request 209. In the illustrated example, it is assumed that the NAF 150 verifies that the request 209 was properly authenticated by the UE 10, and the NAF 150 then proceeds by sending an affirmative response 212 to the UE 10. The response 212 may also include an application-level response from the application server 160, e.g., including information requested by the application-level message conveyed in the request 209.

Subsequently, the subscriber may utilize the network service through the UE 10. In the illustrated example, at some point, the UE 10 may generate or otherwise determine a charging record (CR). As explained above, the UE 10 confirms authenticity of the charging record by associating it with authentication information based on the Ks_X key material and includes the charging record and associated authentication information into a further request 213 to the NAF 150. The UE 10 confirms authenticity of the request 213 by transmitting it together with authentication information based on Ks_NAF key material, e.g., a digest-response based on the Ks_NAF key material. As illustrated, the request 213 also includes the B-TID associated with the Ks_NAF key material.

Upon receiving the request 213, the NAF 150 authenticates the request 213, by looking up the Ks_NAF for the received B-TID, and then using the Ks_NAF key material to check the authentication information associated with the request 213. In the illustrated example, it is assumed that the request 213 is successfully authenticated by the NAF 150, and the NAF 150 thus proceeds by extracting the charging record and associated authentication information from the request 213 and includes the charging record and associated authentication information into a request 214 towards the CRR 120.

Upon receiving the request 214, the CRR 120 authenticates the charging record received with the request 214, using the Ks_X key material and the authentication information associated with the charging record. In the illustrated example, it is assumed that the CRR 120 successfully authenticates the charging record, and the CRR 120 thus proceeds by controlling charging for the network service corresponding to information indicated by the charging record. For example, this may involve sending a charging event indication towards the charging system 130 (not illustrated in FIG. 2). Further, the CRR 120 sends an affirmative response 215 to the NAF 150. The response 215 may for example confirm to the NAF 150 that the charging record was successfully authenticated. Further, the response 215 may confirm to the NAF 150 that charging for the network service is authorized. The CRR 120 may digitally sign or otherwise confirm authenticity of the response 215, e.g., using a certificate obtained from a certification authority. In response to such confirmation, the NAF 150 may keep record of the charging record or information included therein. As further illustrated, the NAF 150 may also send an affirmative response 216 to the UE 10. The response 216 may for example indicate to the UE 10 that charging for the network service is authorized. In response, the UE 10 may continue with allowing the subscriber to access the network service through the UE 10.

In the procedures of FIG. 2, the requests and responses transmitted between the UE 10 and the BSF 110, between the UE 10 and the NAF 150, between the BSF 110 and the NAF 150, and between the NAF 150 and the CRR 120 may be HTTP messages. For example, the requests may correspond to HTTP GET or HTTP POST messages, and the affirmative responses may correspond to HTTP OK messages. The non-affirmative responses 202 and 206 may for example correspond to HTTP error messages, e.g., with error code "401".

Figure 3:
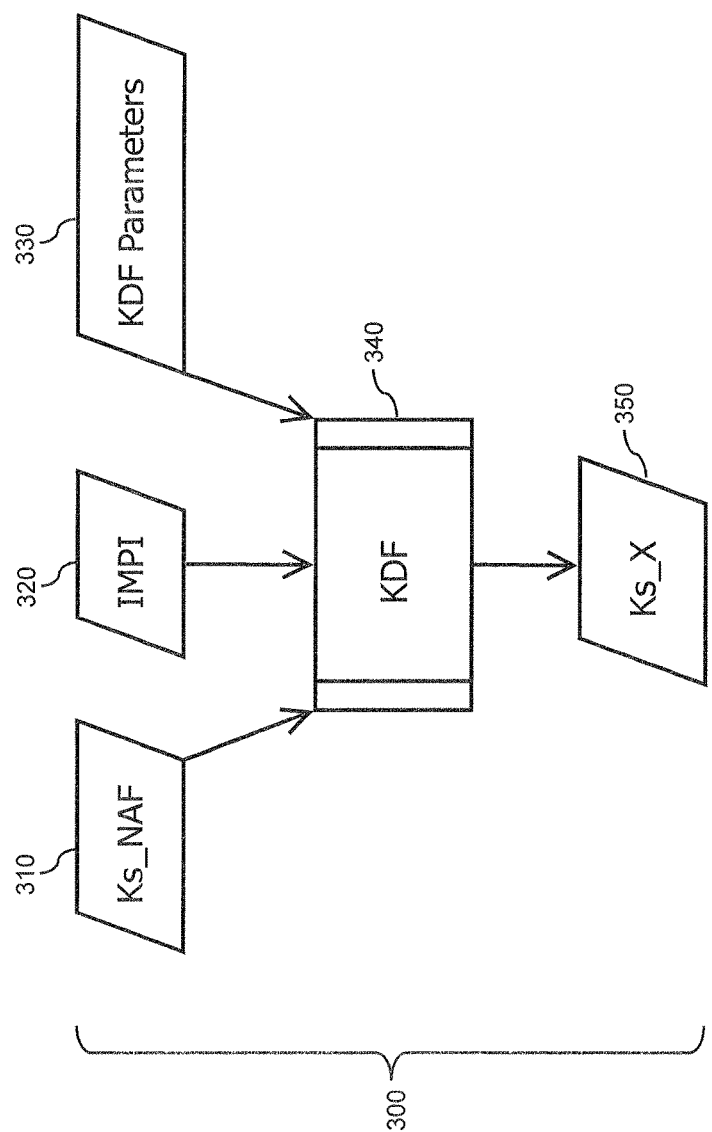
FIG. 3 shows a functional flow for illustrating derivation of charging-specific key material according to an embodiment of the invention.

FIG. 3 shows a functional flow for schematically illustrating a procedure 300 for derivation of the Ks_X key material. The procedure 300 may be performed by the UE 10 and the CRR 120.

As illustrated, the procedure 300 involves that the Ks_NAF key material 310, the IMPI 320, and optionally other KDF parameters 330 are provided as input parameters to a KDF 340. As mentioned above, the KDF 340 may be based on the same or similar cryptographic algorithms as the KDF used for deriving the Ks_NAF key material 310 from the generic Ks key material, as specified in 3GPP TS 33.220. The usage of this KDF has the advantage that it already needs to be implemented to perform GBA authentication, which means that derivation of the Ks_X key material can be implemented in an efficient manner by reusing the already existing KDF. However, other kinds of KDF could be utilized as well. The other KDF parameters 330 which may optionally be used as input to the KDF 340 may for example include a service identifier associated with the network service to be charged. As output, the KDF 340 provides the Ks_X key material 350.

It is to be understood that other ways of deriving the Ks_X key material 350 could be utilized as well. For example, it could be derived from the Ks key material, or any other key material directly or indirectly derived from the Ks key material, Ks_NAF key material, or the Ki key material which is typically stored on the SIM of the UE 10.

Figure 4:
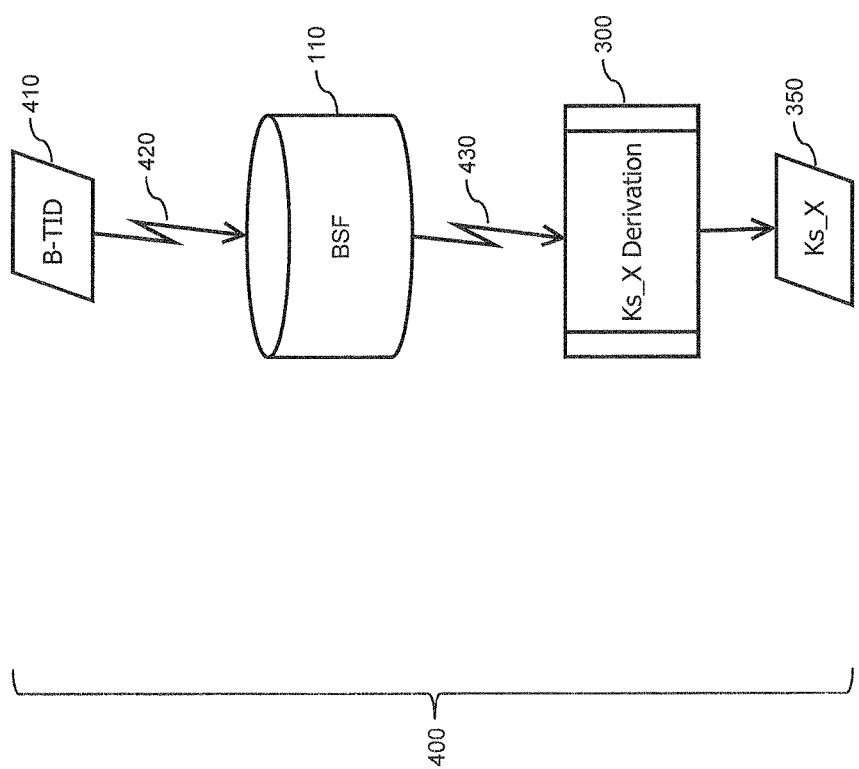
FIG. 4 shows a functional flow for illustrating obtaining of charging-specific key material based according to an embodiment of the invention.

FIG. 4 shows a functional flow for schematically illustrating a procedure 400 for obtaining the Ks_X key material through interaction with the BSF 110. The procedure 400 may be performed by the CRR 120, after the UE 10 has performed the GBA bootstrapping authentication with the BSF 110, and in the course of this GBA bootstrapping authentication the BSF 110 has assigned the B-TID to the Ks_NAF key material obtained through this GBA bootstrapping authentication.

As illustrated, in the procedure 400 the B-TID 410 is provided to the BSF 110. For example, the CRR 120 may send a message 420 including the B-TID 410 to the BSF 110. Based on the B-TID 410, the BSF 110 identifies the corresponding IMPI and Ks_NAF key material. The BSF 110 may then send a message 430 including the identified IMPI and Ks_NAF key material to the CRR 120. Using this information as input, the CRR 120 may then perform the Ks_X derivation procedure 300 and obtain the Ks_X key material 350 as output.

In a variant of the procedure 400, the BSF 110 could implement the Ks_X derivation procedure 300 and send the obtained Ks_X key material 350 to the CRR 120.

Figure 5:
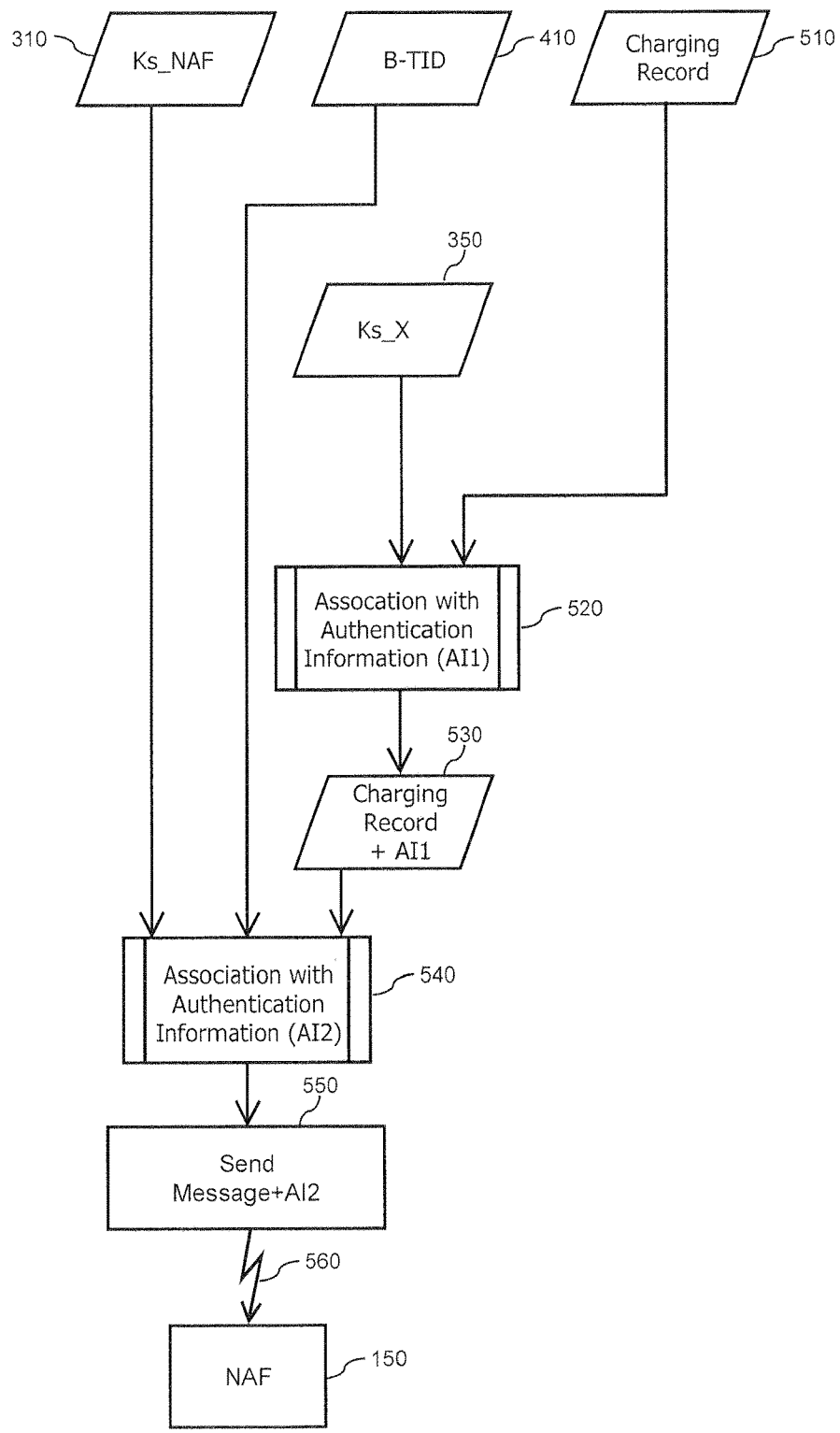
FIG. 5 shows a functional flow for illustrating handling of a charging record by a UE according to an embodiment of the invention.

FIG. 5 shows a functional flow for schematically illustrating a procedure for processing a charging record 510 by the UE 10. As illustrated, the Ks_NAF key material 310, the Ks_X key material 350, as derived using the Ks_X derivation procedure 300, the B-TID 410, and a charging record 510 as explained above are used as input of the procedure.

As illustrated by block 520, the charging record 510 is associated with authentication information (AI1) based on the Ks_X material. Various mechanisms may be used for associating the charging record 510 with the authentication information. For example, the charging record 510 could be cryptographically signed, using the Ks_X key material as signing key for generating a signature. The authentication information associated with the charging record may then correspond to the signature. Further, the charging record 510 could be encrypted at least in part, using Ks_X as encryption key. In that case, successful authentication may correspond to successful decryption at the recipient. For performing the encryption various algorithms could be used. For example, AES (Advanced Encryption Standard) cryptographic algorithms could be used, which may be beneficial because they are also used for other purposes in the GBA technology. The authentication information associated with the charging record may then correspond to redundancy information generated by the encryption. Another possibility would be to utilize a digest authentication mechanism based on the Ks_X key material. The authentication information associated with the charging record may then correspond to a digest response.

As output of block 520, the charging record associated with the first authentication information is obtained, as indicated by block 530. At block 540, a message is generated which includes the charging record 510, the associated authentication information, and the B-TID 410. The charging record and the associated authentication information could be included in a payload section of the message. The message is associated with authentication information (AI2) based on the Ks_NAF key material 310, using the GBA authentication procedure as specified in 3GPP TS 33.220. The authentication information associated with the message may correspond to a digest response. The authentication information associated with the message may be included in a header section of the message. As illustrated by block 550, the UE 10 then sends the message and associated authentication information via the Ua interface to the NAF 150, as illustrated by message 560. The message 560 may be sent in the same way as application-level messages, however with the charging record 510 and the associated authentication information forming the payload of the message 560. In some cases, the charging record and/or associated authentication information may also be sent together with other information to the NAF 150, e.g., as part of, prepended to, appended to, or inserted in an application level-message.

Figure 6:
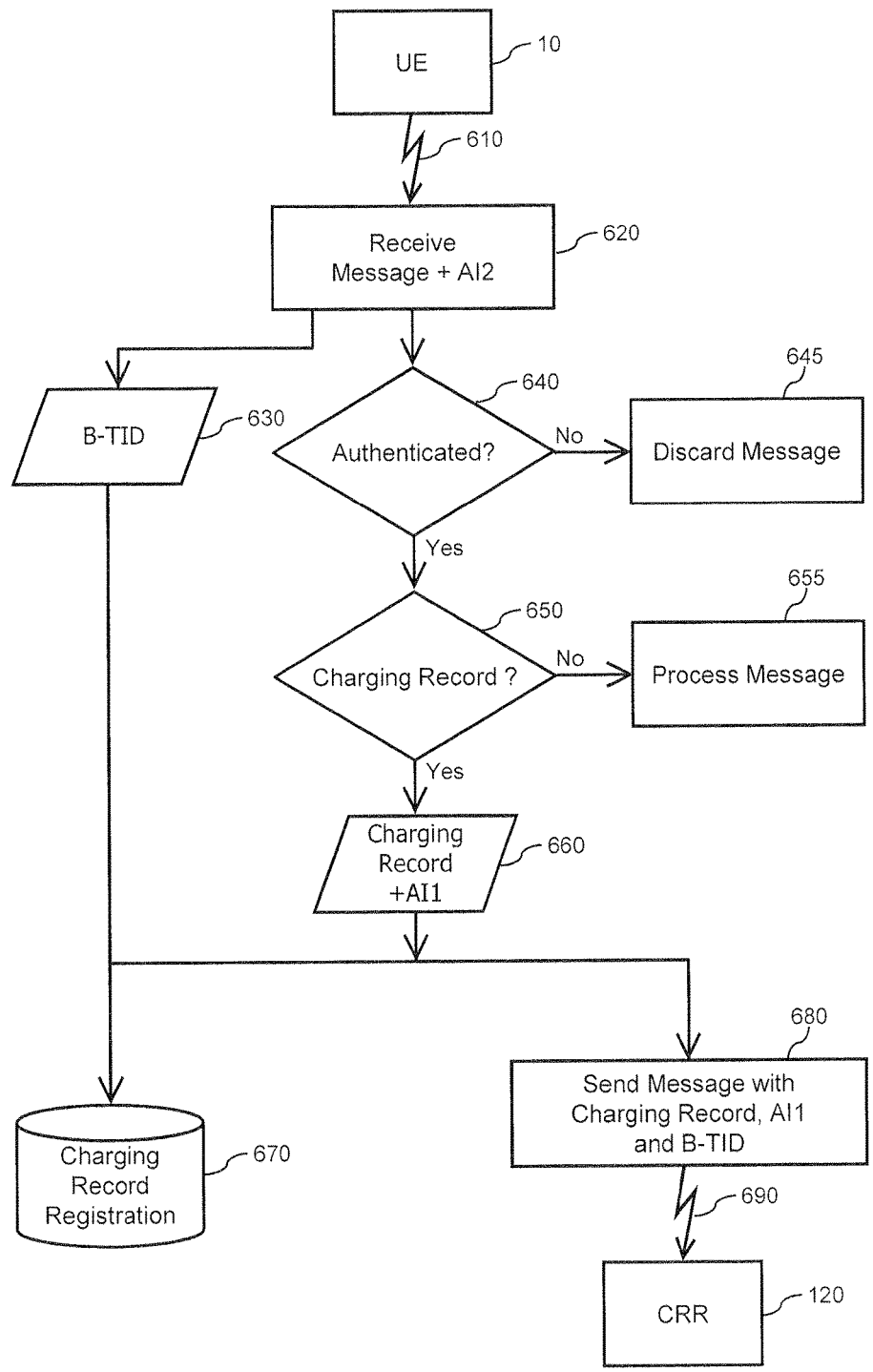
FIG. 6 shows a functional flow for illustrating handling of messages by a NAF according to an embodiment of the invention.

FIG. 6 shows a functional flow for schematically illustrating a procedure for message processing by the NAF 150.

As illustrated, the UE 10 transmits a message 610 with associated authentication information via the Ua interface to the NAF 150. The message 610 may for example correspond to the message 560 of FIG. 5. As illustrated by block 620, the NAF 150 receives the message 610 and the associated authentication information (AI2). In accordance with the GBA authentication procedure, the message 610 includes a B-TID 630, which is extracted by the NAF 150. Further, the NAF 150 authenticates the message 610. This is performed on the basis of the associated authentication information and the Ks_NAF key material as obtained through the GBA bootstrapping authentication procedure from the BSF 110. As explained above, the B-TID 630 may be used by the NAF 150 to obtain the Ks_NAF key material from the BSF 110.

The message 610 may be authenticated in accordance with the GBA authentication procedure as specified in 3GPP TS 33.220.

As illustrated by block 640, if the NAF 150 does not authenticate the message 610, the message 610 is discarded, as illustrated by block 645. Otherwise, if the message 610 is authenticated, the NAF 150 proceeds to check if the message 610 includes a charging record, as illustrated by block 650. If the message 610 does not include a charging record, the message 610 is processed in accordance with the content of the message. For example, if the message 610 includes an application-level message to the application server 160, the NAF 150 may forward the application-level message to the application server 160.

If the message 610 includes a charging record 660, the NAF proceeds by extracting the charging record 660 and associated authentication information (AI1) from the message 610. As illustrated by charging record registration block 670, the NAF 150 may then record the charging record or information therefrom together with the B-TID 630. If the charging record 660 contains a B-TID, and if the charging record 660, or a part of the charging record 660 including the B-TID, is not encrypted, the NAF 150 may also verify if the B-TID from the UE 10 matches the current B-TID under which the UE 10 is known by the NAF 150, or a B-TID it was previously known by. Further, for any non-encrypted part of the charging record 660, the NAF 150 can verify if the included content data matches certain criteria. For example, if the NAF 150 originally created the charging record 660, and then sent it to the UE 10 for authentication, the NAF 150 might check for modifications of the charging record by the UE 10 and also check whether such modifications are permitted or not.

As illustrated by block 680, the NAF 150 sends a message 690 which includes the charging record 660 and the associated authentication information to the CRR 120. If the charging record contained a B-TID, the NAF 150 may include the B-TID from the charging record into the message 690. If the charging record contains no information about the time and duration of usage of the network service, the NAF 150 may assume that the charging record 660 pertains to current usage of the network service and add the currently used B-TID 630 to the message 690. If the charging record contains information about the time of usage of the network service, the NAF 150 may add the B-TID or even multiple B-TIDs which were valid for the UE 10 at that time of usage to the message 690. For implementing the latter functionality, the NAF 150 may establish a historic track record of B-TIDs, mapped to the current B-TID 630. Such tracking of B-TIDs may be avoided by letting the UE 10 regularly send charging records, before a B-TID expires.

Figure 7:
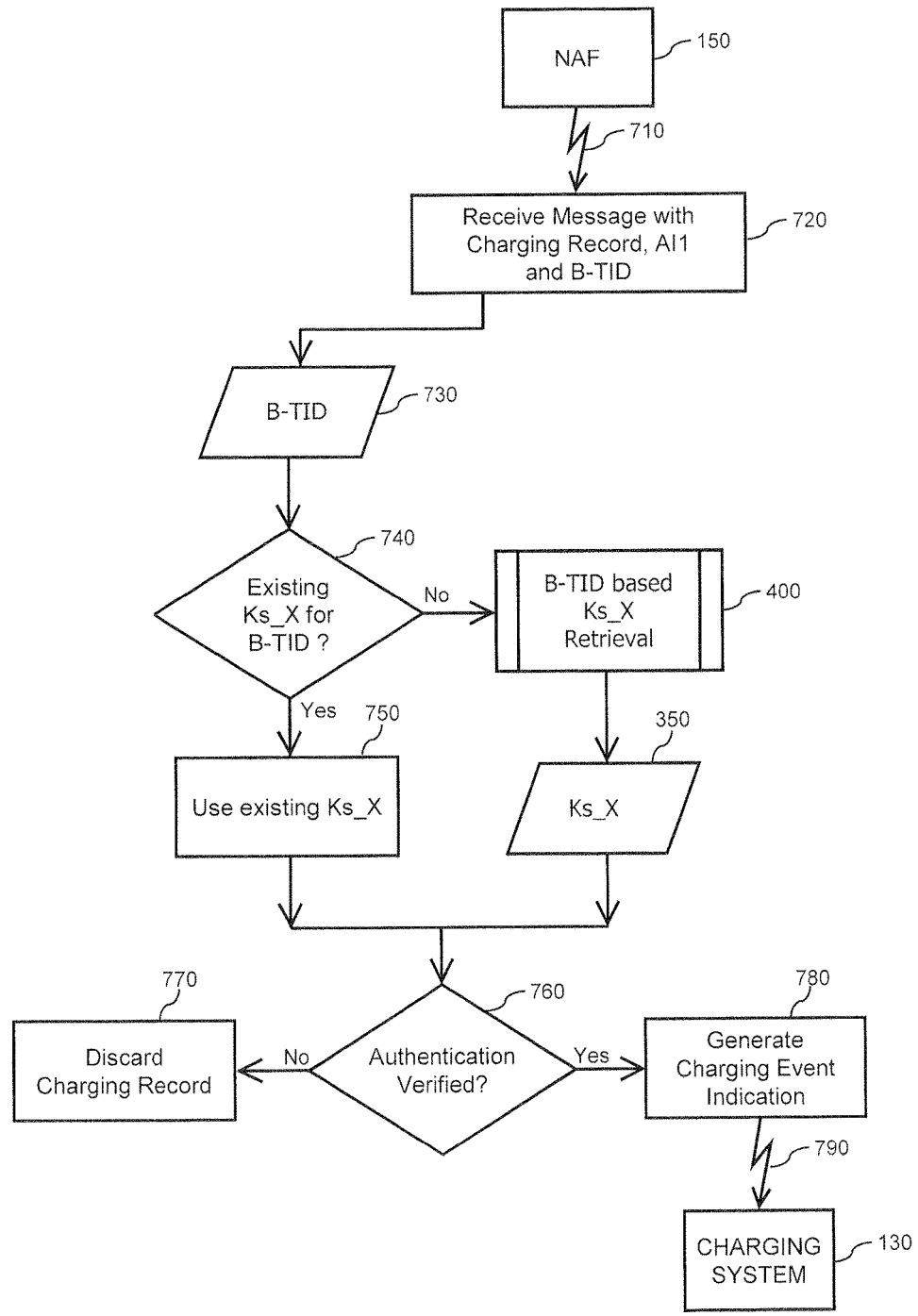
FIG. 7 shows a functional flow for illustrating handling of a charging record by a charging record receiver (CRR) according to an embodiment of the invention.

FIG. 7 shows a functional flow for schematically illustrating a procedure for message processing by the CRR 120. As illustrated, the NAF 150 transmits a message 710 including a charging record and associated authentication information to the CRR 120. The message 710 may for example correspond to the message 690 of FIG. 6. As illustrated by block 720, the CRR 120 receives the message 710 and associated authentication information (AI1).

The CRR 120 then extracts a B-TID 730 (or in some cases even multiple B-TIDs) from the message 710. The CRR 120 may cache derived Ks_X key material per B-TID, in order to avoid obtaining the same Ks_X key material repeatedly. Accordingly, as illustrated by block 740, based on the B-TID 730, the CRR 120 may first check if it has existing Ks_X key material available for the B-TID 730. If this is not the case, the CRR 120 performs the B-TID based Ks_X retrieval procedure 400 as illustrated in FIG. 4 to obtain the Ks_X key material 350. Otherwise, the CRR 120 uses the existing Ks_X key material, as illustrated by block 750.

The CRR 120 then authenticates the charging record received in the message 710, using the associated authentication information and the Ks_X key material corresponding to the B-TID 730. The procedure of authenticating the charging record depends on the utilized authentication mechanism. For example, if the authentication mechanism is based on signing the charging record with Ks_X key material, the procedure of authenticating the charging record may involve verifying the validity of the signature based on the Ks_X key material as available at the CRR 120. Further, if the authentication mechanism is based on encrypting at least a part of the charging record using the Ks_X key material as encryption key, the procedure of authenticating the charging record may involve decrypting the encrypted part of the charging record using the Ks_X key material as decryption key. Further, if the authentication mechanism is based on digest authentication, the procedure of authenticating the charging record may involve using the Ks_X key material for checking a response to a digest challenge.

If verification of authentication of the charging record by the CRR 120 fails, CRR 120 discards the charging record, as indicated by block 770. The CRR 120 may then send a corresponding negative acknowledgement to the NAF 150.

If the CRR 120 can successfully authenticate the charging record, it controls charging of the network service based on the charging record. For example, the CRR 120 may send a charging event indication 790 to the charging system 130 and also provide information from the charging record to the charging system 130, as illustrated by block 780. For this purpose, the CRR 120 may identify the subscriber by using the B-TID 730 (or B-TIDs) indicated in the message 710. Specifically, the CRR 120 may determine the IMPI associated with the B-TID through the interaction with the BSF 110, and use the IMPI to identify the subscriber. If the message 710 includes one or more historic B-TIDs, the CRR 120 may use one or more of the historic B-TIDs for determining the IMPI and identifying the subscriber. For implementing the latter functionality, the CRR 120 may establish a historic track record of B-TIDs.

In response to successfully authenticating the charging record, the CRR 120 may also positively acknowledge successful authentication of the authentication to the NAF 150. In response to interaction with the charging system 130, the CRR 120 may alternatively or additionally also positively acknowledge authorization of charging for the network service to the NAF 150. In some cases, interaction of the CRR 120 with the charging system 130 may also reveal that charging for the network service is not authorized for the subscriber, e.g., because the subscriber is out of quota. The CRR 120 may then indicate to the NAF 150 that charging is unauthorized for usage of the network service by the subscriber.

When positively or negatively indicating successful authentication and/or authorization of charging to the NAF 150, the CRR 120 may digitally sign or otherwise confirm authenticity the corresponding message to the NAF 150. For this purpose, the CRR 120 may use a certificate from a Certification Authority (CA), in line with laws and regulations for providing certificates for legally binding signatures. Alternatively, the involved parties, i.e., the operator of mobile communication network and the service provider, may agree on other signature or authentication procedures. With the digitally signed confirmations the NAF 150, and thus the service provider automatically receives proof of the charging performed by the operator for the network service. This information may then be used for calculating a monetary or other compensation owed by the operator to the service provider.

For controlling the charging for the network service, various ways of interacting with the charging system 130 are possible. Details of such interaction also depend on the implementation of the mobile communication system and its charging architecture. The charging system 130 may be based on standardized or proprietary interfaces. Examples of standardized interfaces which can be used between the CRR 120 and the charging system 130 can be found in 3GPP TS 32.200 and 3GPP TS 32.240.

For example, the CRR 120 could be equipped with, or have access to, a Charging Trigger Function (CTF) as specified in 3GPP TS 32.240. The CTF may be configured in such a way that the successful authentication of a charging record is a trigger event for the CTF. The CTF, when triggered, may use the charging record data and, depending on the content of the charging record, the network service, the configuration of the CTF, and charging needs, may use the Rf or Ro interface to provide charging data to the charging system 130. For example, the CTF may contact either a Charging Data Function (CDF) via the Rf interface or an Online Charging Function (OCF) via the Ro interface. In accordance with 3GPP TS 32.240, the CDF may be integrated with the CTF, which in turn may be integrated in the CRR, or it may be a separate element. Similar considerations apply with respect to the OCF and its components. To simplify operation of the CTF it may be beneficial to set the content of the charging record in such a way that it can easily be used on the interfaces of the CTF, e.g., the Rf or Ro interface. For example, 3GPP TS 32.299 defines data formats which can be used in the Diameter protocol specified for these interfaces, and similar data formats could also be used in the charging record.

Accordingly, to implement the above-described concepts, a UE supporting the GBA technology may be further enhanced with functionalities including one or more of: a functionality to derive Ks_X key material from Ks_NAF and its IMPI, a functionality to create a charging record indicating the UE is currently uses a network service, a functionality to associate the charging record with authentication information based on Ks_X key material, and a functionality to send the charging record and associated authentication information in a message secured by GBA authentication via the Ua interface to the NAF.

Further, to implement the above-described concepts a NAF of the GBA technology may be further enhanced with functionalities including one or more of: a functionality to receive messages with charging records and associated authentication information via the Ua interface, a functionality to separate such messages from application-level messages, a functionality to perform GBA authentication of such messages using the Ks_NAF key material, a functionality to extract the charging record and associated authentication information from the received message, a functionality to send the charging record and associated authentication information to a CRR, a functionality to generate a message to be sent to the CRR, which includes the charging record, the associated authentication information, and the B-TID received together with the charging record, a functionality to receive responses from the CRR, e.g., positively or negatively acknowledging authentication of the charging record or authorization of charging for the network service, a functionality to keep record of charging records or other information sent to the CRR, and a functionality to keep record of responses received from the CRR, e.g., positively or negatively acknowledging authentication of the charging record or authorization of charging for the network service.

Further, to implement the above-described concepts a network node acting as a CRR may be provided with functionalities including one or more of: a functionality to receive messages including charging records and associated authentication information from a NAF of the GBA technology, a functionality to extract the charging record and associated authentication information from such a message, a functionality to extract a B-TID from such a message, a functionality to use a B-TID to query a BSF of the GBA technology for the corresponding Ks_NAF key material and IMPI, a functionality to derive the Ks_X key material from Ks_NAF key material and the IMPI, a functionality to authenticate a charging record using the Ks_X key material, a functionality to interact with a charging system of the mobile communication network, e.g., by creating and sending messages and handling responses as required by the charging system, in particular charging event indications, a functionality to generate response messages towards the NAF, e.g., positively or negatively acknowledging authentication of the charging record, and a functionality to confirm authenticity of such response message, e.g., with a certificate obtained from a certification authority.

Figure 8:
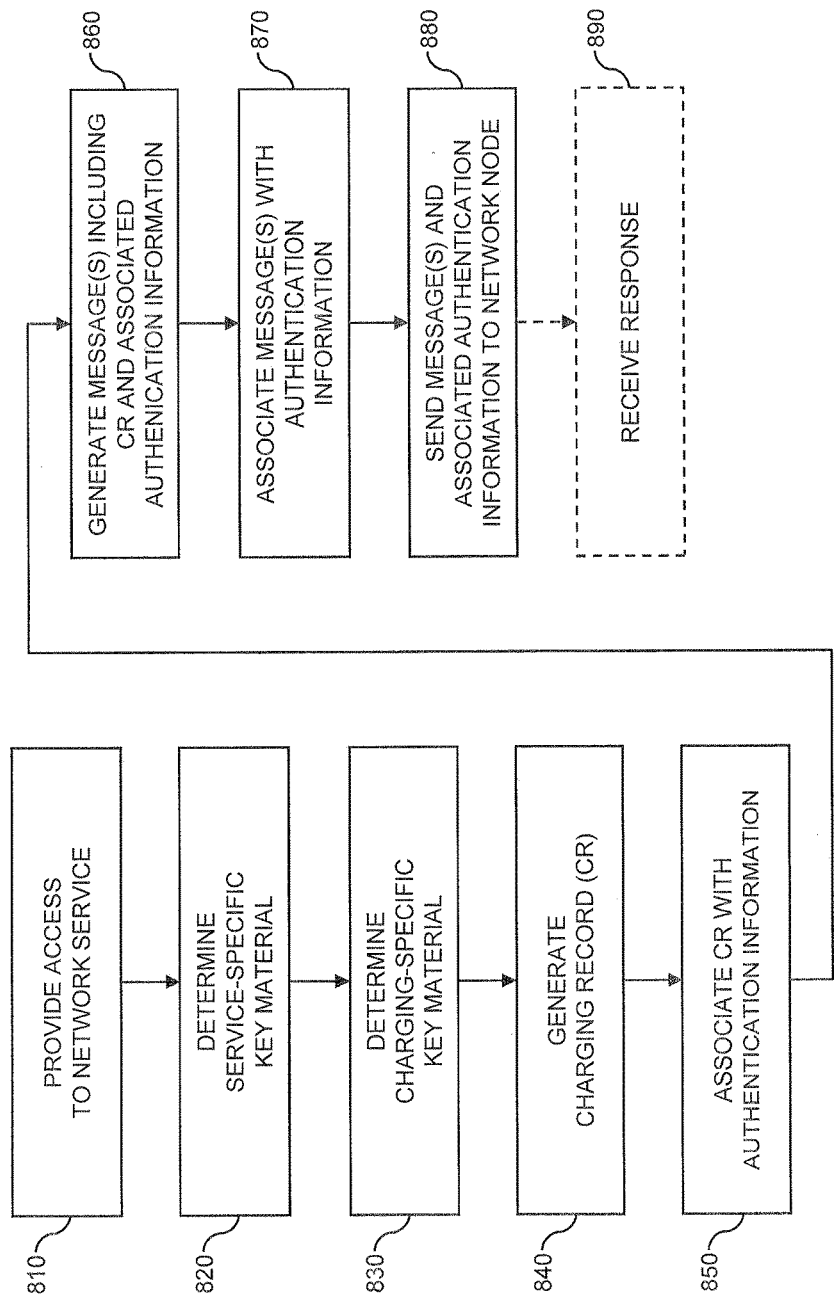
FIG. 8 shows a flowchart for illustrating a method according to an embodiment of the invention, which may be implemented by a user device.

FIG. 8 shows a flowchart for illustrating a method of controlling utilization of a network service in a communication network. The method of FIG. 8 may be utilized for implementing the concepts illustrated above in a user device, e.g., in a UE for a mobile communication network, such as the UE 10. The user device may for example correspond to a mobile phone or to a computer with cellular radio network connectivity. If a processor-based implementation of the user device is used, the steps of the method may be performed by one or more processors of the user device. In such a case the user device may further comprise a memory for storing program code which, when executed by the processor(s), causes the user device to perform the steps of the method.

At step 810, the user device provides a subscriber with access to a network service. The network service may be provided by a service provider which is not identical to an operator of the communication network, to which the subscriber is subscribed. The service provide thus typically has no or limited access to subscriber data maintained by the operator of the communication network. Specifically, access to a subscriber identity of the subscriber may not be desired by the subscriber, i.e., the subscriber may want to use the network service in an anonymized manner, without revealing a subscriber identity, e.g., an IMPI, to the service provider or network nodes controlled by the service provider.

At step 820, the user device determines service-specific key material. An example of such service-specific key material is the above-mentioned Ks_NAF key material. At step 830, the user device determines charging-specific key material. An example of such charging-specific key material is the above-mentioned Ks_X key material.

The user device may derive the charging-specific key material from the subscriber identity. In some scenarios, the user device may the charging-specific key material from the subscriber identity and the service-specific key material. In some scenarios, the user device may receive generic key material from another network node and deriving the charging-specific key material and the service-specific key material from the received generic key material. Such other network node may correspond to a BSF of the GBA technology, and the generic key material may correspond to the Ks key material used in the GBA technology. This other network node may be capable of relating the charging-specific key material and the service-specific key material to the subscriber identity.

At step 840, the user device determines a charging record indicating usage of the network service by the subscriber, such as the charging record 510. For this purpose, the charging record may be originally created by the user device. Further, the charging record may have been originally created by some other entity and sent to the user device, and the user device may determine the charging record by processing the charging record received from the other entity, e.g., by modifying the charging record or just authenticating the charging record.

At step 850, the user device associates the charging record with first authentication information based on the charging-specific key material. For this purpose, the user device may add the authentication information to the charging record. However, other ways of associating the authentication information with the charging record are possible as well, e.g., using a hash function of the charging record as input for determining the first authentication information. The user device may authenticate the charging record based on an authentication mechanism involving signing the charging record with the charging-specific key material. In this case the first authentication information may correspond to a digital signature determined from the charging-specific key material. Further, the user device may authenticate the charging record based on an authentication mechanism involving encryption of at least a part of the charging record with the charging-specific key material. In this case the first authentication information may correspond to redundancy information generated by encryption of the charging record. Further, the user device may authenticate the charging record based on an authentication mechanism based on digest authentication using the charging-specific key material for calculating a digest challenge and a response to the digest challenge. In this case the first authentication information may correspond to the digest response.

At step 860, the user device generates at least one message including the charging record and the associated first authentication information. More specifically, a message may be generated which includes both the charging record and the associated first authentication information. Further, a first message may be generated which includes the charging record, and a second message may be generated which includes the authentication information. Each of such messages may also include other information, such as an application level message associated with the network service.

At step 870, the user device associates the message(s) with second authentication information based on the service-specific key material. For this purpose, the user device may add the second authentication information to the message(s) generated at step 870. Again, various kinds of authentication mechanisms may be used. In some scenarios, if the communication network is a mobile communication network as specified by 3GPP, the authentication of the message(s) may be performed by GBA authentication as specified in 3GPP TS 33.220. In this case the second authentication information may correspond to a digest response. Examples of such message with associated authentication information are the request 213, the message 560, and the message 610.

The message(s) may also include an identifier associated with the charging-specific key material and the service-specific key material. For example, when using GBA authentication, this identifier may correspond to a B-TID.

At step 880, the user device sends the message(s) and the associated second authentication information to a network node. This network node may be controlled by the service provider of the network service or and may participate in providing the network service to the user device, e.g., by forwarding user traffic of the network service to and/or from the user device. Accordingly, the user device may send user plane traffic of the network service to the network node and/or receive user plane traffic of the network service from the network node.

The network node may for example correspond to a NAF of the GBA technology as specified in 3GPP TS 33.220.

In order to maintain anonymity of the subscriber, the network node is incapable of relating any of the charging-specific key material and the service-specific key material to the subscriber identity of the subscriber. For example, this may be achieved by denying access of the network node to the subscriber identity and avoiding that the subscriber itself reveals the subscriber identity to the network node.

At optional step 890, the user device may receive a response to the message(s) sent at step 880 from the network node. The response may indicate that usage of the network service by the subscriber is authorized. Alternatively, the response may indicate that usage of the network service by the subscriber is unauthorized. An example of such response is the response 216 of FIG. 2.

Figure 9:
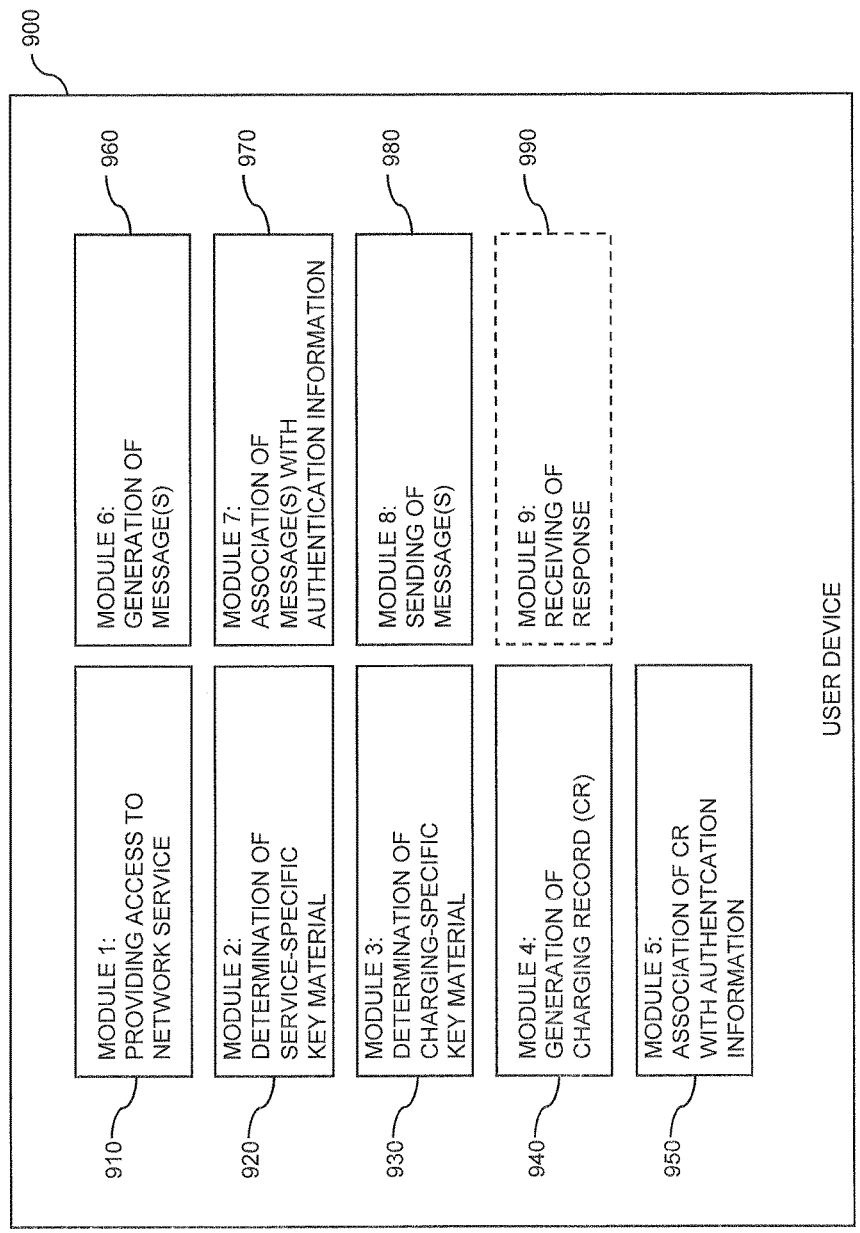
FIG. 9 shows a block diagram for illustrating functionalities of a user device according to an embodiment of the invention.

FIG. 9 shows a block diagram for illustrating functionalities of a user device 900 which operates according to the method of FIG. 8. As illustrated, the user device 900 may be provided with a module 910 configured to provide access to a network service to a subscriber, such as explained in connection with step 810. Further, the user device 900 may be provided with a module 920 configured to determine service-specific key material, such as explained in connection with step 820. Further, the user device 900 may be provided with a module 930 configured to determine charging-specific key material, such as explained in connection with step 830. Further, the user device 900 may be provided with a module 940 configured to determine a charging record indicating usage of the network service by the subscriber, such as explained in connection with step 840. Further, the user device 900 may be provided with a module 950 configured to associate the charging record with first authentication based on the charging-specific key material, such as explained in connection with step 850. Further, the user device 900 may be provided with a module 960 configured to generate at least one message including the charging record and the associated first authentication information, such as explained in connection with step 860. Further, the user device 900 may be provided with a module 970 configured to associate the at least one message with second authentication information based on the service-specific key material, such as explained in connection with step 870. Further, the user device 900 may be provided with a module 980 configured to send the at least one message and the associated second authentication information to a network node, such as explained in connection with step 880. Further, the user device 900 may be optionally provided with a module 990 configured to receive a response to the at least one message from the network node, such as explained in connection with step 890.

It is noted that the user device 900 may also include further modules for implementing other functionalities as described above, such as functionalities for supporting usage of the network service, functionalities for deriving the charging-specific key material for service-specific key material.

Figure 10:
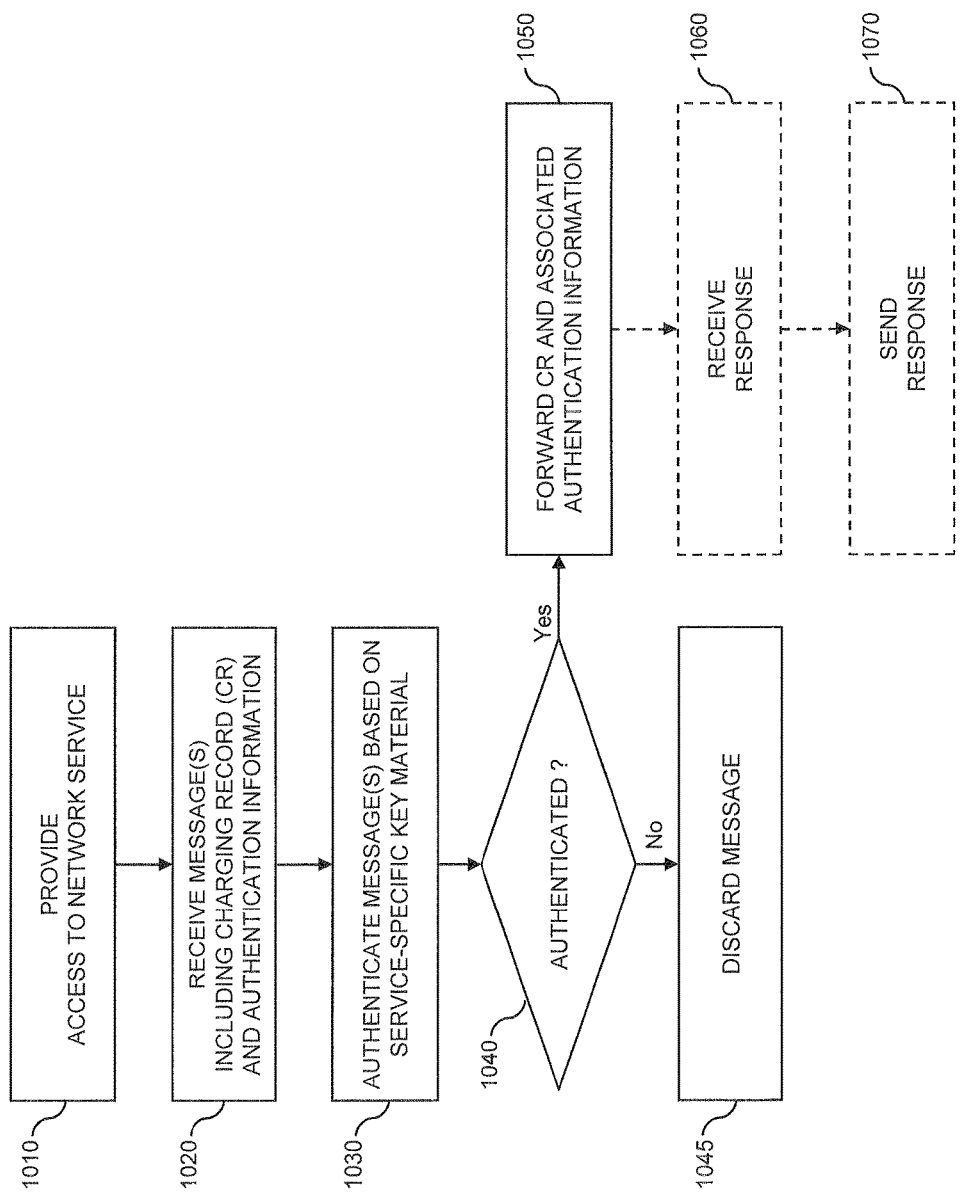
FIG. 10 shows a flowchart for illustrating a further method according to an embodiment of the invention, which may be implemented by a network node.

FIG. 10 shows a flowchart for illustrating a further method of controlling utilization of a network service in a communication network. The method of FIG. 10 may be utilized for implementing the concepts illustrated above in a network node, e.g., in a node supporting provision of the network service to a user device. The network node may be controlled by the service provider of the network service. The network node may for example correspond to an NAF of the GBA technology, such as the NAF 150. If a processor-based implementation of the network node is used, the steps of the method may be performed by one or more processors of the network node. In such a case the network node may further comprise a memory for storing program code which, when executed by the processor(s), causes the network node to perform the steps of the method.

At step 1010, the network node provides access to a network service through a user device connected to the network node. The user device may for example correspond to a UE for a mobile communication network, such as the UE 10, e.g., a mobile phone or to a computer with cellular radio network connectivity. The network node may provide the network service to the user device by transmitting user traffic of the network service, e.g., by forwarding user traffic of the network service to and/or from the user device.

At step 1020, the network node receives at least one message and first authentication information associated with the message from the user device. Examples of such message are in the above-mentioned messages 213, 560, and 610. The first authentication information is based on service-specific key material. The at least one message includes a charging record and second authentication information associated with the charging record. The charging record indicates usage of the network service by a subscriber. An example of such charging record is the above-mentioned charging record 510. The second authentication information associated with the charging record is based on charging-specific key material.

The charging-specific key material may be derived from the subscriber identity. In particular, the charging-specific key material may be derived from the subscriber identity and the service-specific key material. An example of such charging-specific key material is the above-mentioned Ks_X key material. An example of such service-specific key material is the above-mentioned Ks_NAF key material.

The network node may receive the service-specific key material from another network node. In some scenarios, the message(s) received at step 1020 may include an identifier and the network node may receive the service-specific key material based on the identifier. For example, if the message is secured by GBA authentication based on the Ks_NAF key material, the network node, corresponding to an NAF, may obtain the Ks_NAF key material from a BSF, such as the BSF 110, based on the B-TID included in the message.

In order to maintain anonymity of the subscriber, the network node is incapable of relating any of the charging-specific key material and the service-specific key material to a subscriber identity of the subscriber. For example, this may be achieved by denying access of the network node to the subscriber identity and avoiding that the subscriber itself reveals the subscriber identity to the network node.

At step 1030, the network node authenticates the message(s) received at step 1020. This is accomplished based on the service-specific key material and the first authentication associated with the message(s). For this purpose, the network node may check the first authentication information included and compare it to information locally derived from on the service-specific key material. Details of the verification procedure may depend on the utilized authentication mechanism. In some scenarios, if GBA authentication is used, the authentication may be performed by calculating a digest response based on the Ks_NAF key material.

As illustrated by step 1040 and branch "Yes", in response to authenticating the message(s) the network node proceeds to step 1050 and forwards the charging record and the associated second authentication information to a further network node which is capable of relating the charging-specific key material to a subscriber identity of the subscriber. An example of such further network node is the above-mentioned CRR, in particular the CRR 120.

As illustrated by step 1040 and branch "No", in response to not authenticating the message(s) the network node may proceed to step 1045 and discard the message(s).

In some scenarios, the network node may also perform one or more further checks, e.g., whether the received charging record is correctly formatted or otherwise consistent, e.g., if it is consistent with charging data measured by the network node. In some cases, the network node may have created the charging record and sent it to the user device for authentication and/or modification. The network node may then check whether there are modifications of the charging record received at step 1020 and whether such modifications are permitted. If an inconsistency or unpermitted changes are found, the charging record could be discarded.

As illustrated by optional step 1060, the network node may also receive a response from the further network node. The response may be signed, or its authenticity may be otherwise confirmed by the further network node. The response may, positively or negatively, indicate whether the charging record was authenticated by the further network node. Alternatively or in addition, the response may, positively or negatively, indicate whether charging of the network service is authorized for the subscriber. An example of such response is the above-mentioned response 215. Based on the response, the network node may record the charging record or information included in the charging record. Further, the response may also be used for controlling provisioning of the network service by the network node. For example, in response to the charging of the network service being unauthorized, the network node may denying the access to the network service through the user device.

As illustrated by optional step 1070, the network node may also send a response to the message(s) received at step 1020 to the user device. The response may indicate that usage of the network service by the subscriber is authorized. Alternatively, the response may indicate that usage of the network service by the subscriber is unauthorized. An example of such response is the response 216 of FIG. 2. The content of the response may be determined by the network node depending on the response as received at step 1060 from the further network node.

Figure 11:
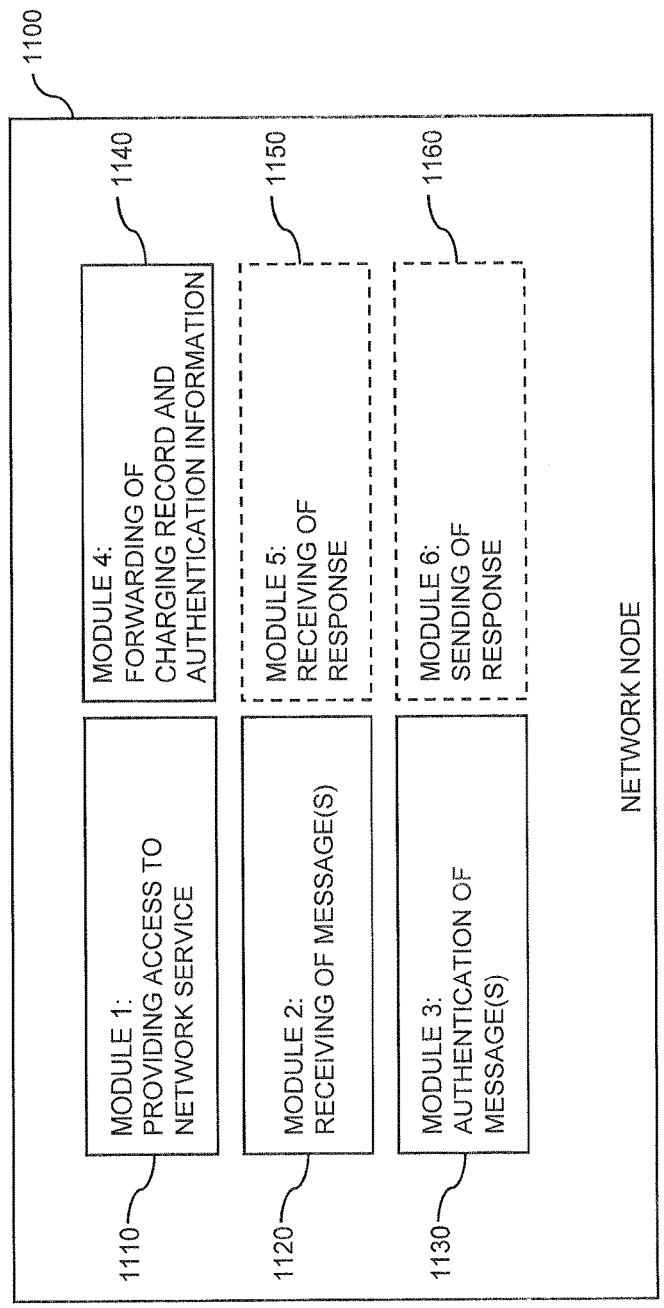
FIG. 11 shows a block diagram for illustrating functionalities of a network node according to an embodiment of the invention.

FIG. 11 shows a block diagram for illustrating functionalities of a network node 1100 which operates according to the method of FIG. 10. As illustrated, the network node 1100 may be provided with a module 1110 configured to provide access to a network service, such as explained in connection with step 1010. Further, the network node 1100 may be provided with a module 1120 configured to receive at least one message and associated first authentication information, including a charging record and associated second authentication information from a user device, such as explained in connection with step 1020. Further, the network node 1100 may be provided with a module 1130 configured to authenticate the received message(s) based on the associated first authentication information and the service-specific key material, such as explained in connection with step 1030. Further, the network node 1100 may be provided with a module 1140 configured to, in response to authenticating the received message(s), forward the charging record and associated second authentication information to a further network node, such as explained in connection with step 1050. Further, the network node 1100 may optionally be provided with a module 1150 configured to receive a response from the further network node, such as explained in connection with step 1060. Further, the network node 1100 may optionally be provided with a module 1160 configured to send a response to the received message(s) to the user device, such as explained in connection with step 1070.

It is noted that the network node 1100 may also include further modules for implementing other functionalities as described above, such as functionalities for obtaining the service-specific key material or functionalities of controlling provisioning of the network service depending on whether the authentication of the charging record could be successfully verified by the further network node.

Figure 12:
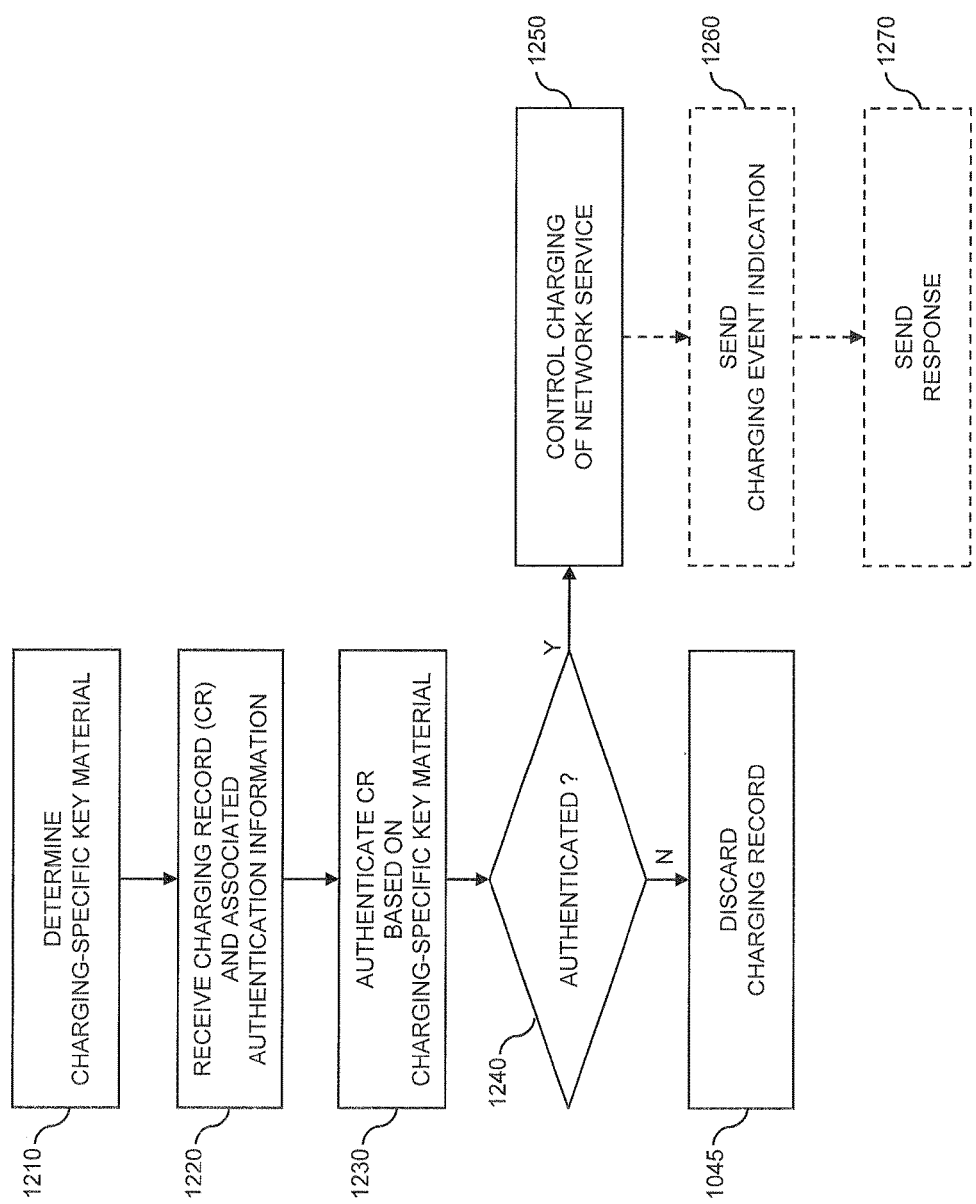
FIG. 12 shows a flowchart for illustrating a further method according to an embodiment of the invention, which may be implemented by a further network node.

FIG. 12 shows a flowchart for illustrating a further method of controlling utilization of a network service in a communication network. The method of FIG. 12 may be utilized for implementing the concepts illustrated above in a network node, e.g., in a node controlling charging of the network service. The network node may be controlled by the operator of the communication network. The network node may for example correspond to the above-mentioned CRR, in particular to the CRR 120. If a processor-based implementation of the network node is used, the steps of the method may be performed by one or more processors of the network node. In such a case the network node may further comprise a memory for storing program code which, when executed by the processor(s), causes the network node to perform the steps of the method.

At step 1210, the network node determines charging-specific key material related to a subscriber identity of a subscriber. The network node is thus capable of relating the charging-specific key material to the subscriber identity of the subscriber, e.g., to an IMPI.

The network node may derive the charging-specific key material from the subscriber identity. In particular, the network node may derive the charging-specific key material from the subscriber identity and service-specific key material, such as the above-mentioned Ks_NAF key material. An example of such charging-specific key material is the above-mentioned Ks_X key material. In some cases, the network node may also receive the charging-specific key material or key material for deriving the charging-specific key material, such as the service-specific key material, from another network node. For example, if the communication network supports the GBA technology, the network node may obtain the Ks_NAF key material from a BSF, such as the BSF 110, and use the obtained Ks_NAF key material for deriving the charging-specific key material, in particular the Ks_X key material.

At step 1220, the network node receives a charging record and authentication information associated with the charging record from a further network node. In order to maintain anonymity of the subscriber, the further network node is incapable of relating the charging-specific key material to a subscriber identity of the subscriber. For example, this may be achieved by denying access of the network node to the subscriber identity and avoiding that the subscriber itself reveals the subscriber identity to the network node. The further network node may be controlled by the service provider of the network service. The further network node may for example correspond to an NAF of the GBA technology, such as the NAF 150.

The charging record indicates usage of the network service by the subscriber. An examples of such charging record are the above-mentioned charging record 510. The authentication information associated with the charging record is based on the charging-specific key material.

The network node may receive the charging record together with an identifier. The network node may then use the identifier for relating the charging-specific key material used for authenticating the charging record to the subscriber identity, e.g., to the IMPI. For example, the identifier may identify the service-specific key material as used together with the subscriber identity for deriving the charging-specific key material. When the service-specific key material corresponds to Ks_NAF key material as used in GBA authentication, the identifier may correspond to a B-TID associated with the Ks_NAF key material. In some scenarios, the identifier received together with the charging record may also be utilized by the network node for obtaining the service-specific key material used for deriving the charging-specific key material.

At step 1230, the network node authenticates the charging record. This is accomplished based on the charging-specific key material and the authentication information associated with the received charging record. For this purpose, the network node may compare the authentication information associated with the charging record to information locally derived from the charging-specific key material. Details of the verification procedure may depend on the utilized authentication mechanism. For example, if an authentication mechanism is used which is based on signing the charging record using the charging-specific key material for determining a signature, the authentication may involve checking the signature of the charging record based on the charging-specific key material. Further, if an authentication mechanism is used which is based on encrypting at least a part of the charging record using the charging-specific key material as encryption key, the authentication may involve decrypting the encrypted part of the charging record using the charging-specific key material as decryption key. Successful decryption may then be interpreted as successful authentication. Further, if an authentication mechanism is used which is based on digest authentication, the authentication may involve calculating a response to a digest challenge based on the charging-specific key material.

As illustrated by step 1240 and branch "Yes", in response to authenticating the charging record the network node proceeds to step 1250 and controls charging of the network service. This may involve interaction with a charging system of the communication network. For example, the network node may generate a charging event indication, as indicated by optional step 1260, and/or provide information from the charging record to the charging system. The network node may also check with the charging system whether charging of the network service is authorized for the subscriber.

As illustrated by step 1240 and branch "No", in response to not authenticating the charging record the network node may proceed to step 1245 and discard the charging record.

As illustrated by optional step 1270, the network node may also send a response to the further network node. The response may be signed, or authenticity of the response may be otherwise confirmed by the network node. The response may, positively or negatively, indicate whether the charging record was authenticated by the network node. Alternatively or in addition, the response may, positively or negatively, indicate whether charging of the network service is authorized for the subscriber. An example of such response is the above-mentioned response 215.

Figure 13:
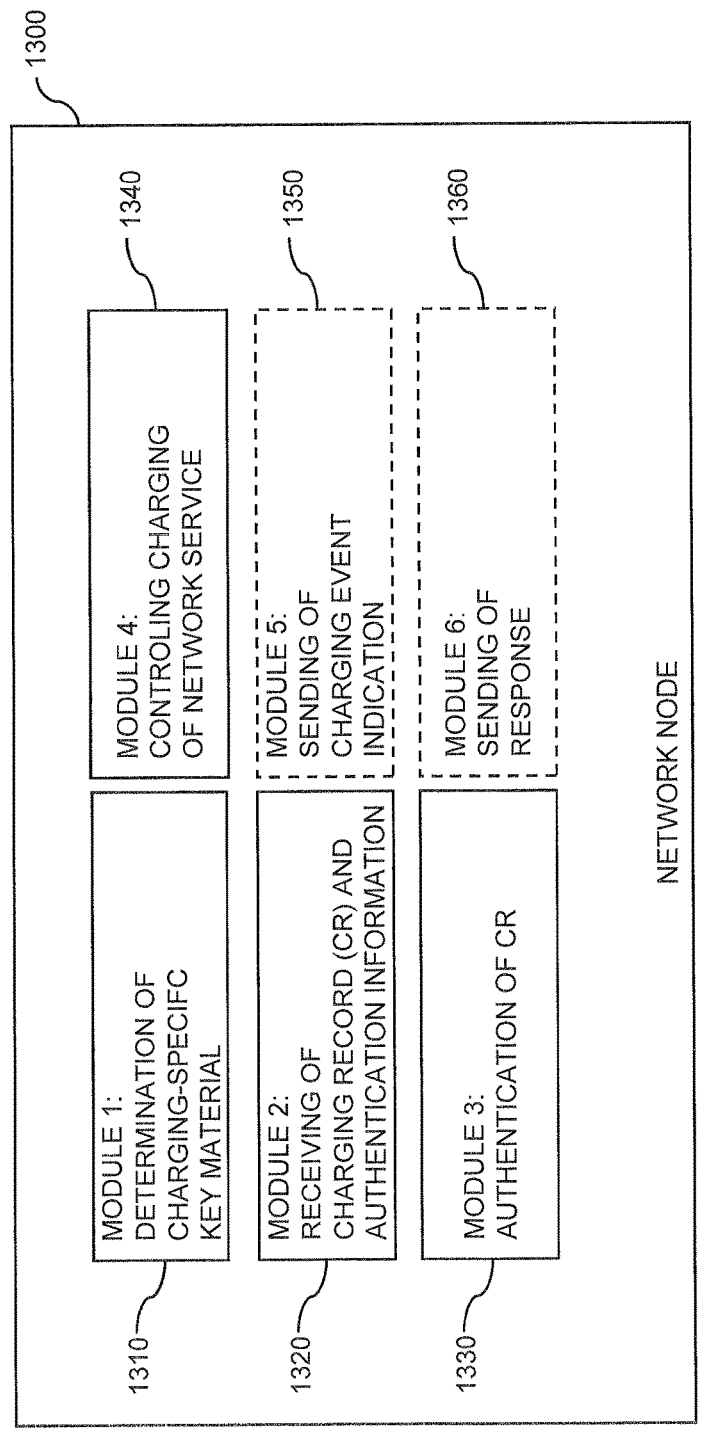
FIG. 13 shows a block diagram for illustrating functionalities of a further network node according to an embodiment of the invention.

FIG. 13 shows a block diagram for illustrating functionalities of a network node 1300 which operates according to the method of FIG. 12. As illustrated, the network node 1300 may be provided with a module 1310 configured to determine charging-specific key material, such as explained in connection with step 1210. Further, the network node 1300 may be provided with a module 1320 configured to receive a charging record and associated authentication information from a further network node, such as explained in connection with step 1220. Further, the network node 1300 may be provided with a module 1330 configured to authenticate the received charging record based on the charging-specific key material and the authentication information associated with the charging record, such as explained in connection with step 1230. Further, the network node 1300 may be provided with a module 1340 configured to, in response to authenticating the received charging record, control charging of the network service, such as explained in connection with step 1250. Further, the network node 1300 may optionally be provided with a module 1350 configured to send a charging event indication and/or information included in the charging record to a charging system of the communication network, such as explained in connection with step 1260. Further, the network node 1300 may optionally be provided with a module 1360 configured to send a response to the further network node, such as explained in connection with step 1270.

It is noted that the network node 1300 may also include further modules for implementing other functionalities as described above, such as functionalities for obtaining the charging-specific key material or functionalities for interacting with the charging system of the communication network.

It is to be understood that the methods of FIGS. 8, 10, and 12 may also be combined in a system including a user device operating according to the method of FIG. 8, a first network node operating according to the method of FIG. 10, and a second network node operating according to the method of FIG. 12. In such a system, the user device could provide the subscriber with access to the network service, determine charging-specific key material, determine the service-specific key material, determine a charging record indicating usage of the network service by the subscriber, associate the charging record with first authentication information based on the charging-specific key material, generate at least one message including the charging record and the associated first authentication information, associate the at least one message with second authentication information based on the service-specific key material, and send the at least one message and the associated second authentication information to the first network node. The first network node could receive the at least one message and the associated second authentication information from the user device, based on the service-specific key material and the second authentication information, authenticate the at least one message, and in response to authenticating the at least one message, forward the charging record and the associated first authentication information to the second network node. The second network node could receive the charging record and the associated first authentication information from the first network node, based on the charging-specific key material and the first authentication information, authenticate the charging record, and in response to authenticating the charging record, control charging of the network service. The first network node of the system would thus correspond to the network node of the methods of FIGS. 8 and 10, and to the further network node of the method of FIG. 12. Similarly, the second network node of the system would thus correspond to the further network node of the method of FIG. 10, and to the network node of the method of FIG. 12. The first authentication information used in the system would correspond to the first authentication information used in the method of FIG. 8, to the second authentication information used in the method of FIG. 10, and to the authentication information used in the method of FIG. 12. The second authentication information used in the system would correspond to the second authentication information used in the method of FIG. 8 and to the first authentication information used in the method of FIG. 10.

Figure 14:
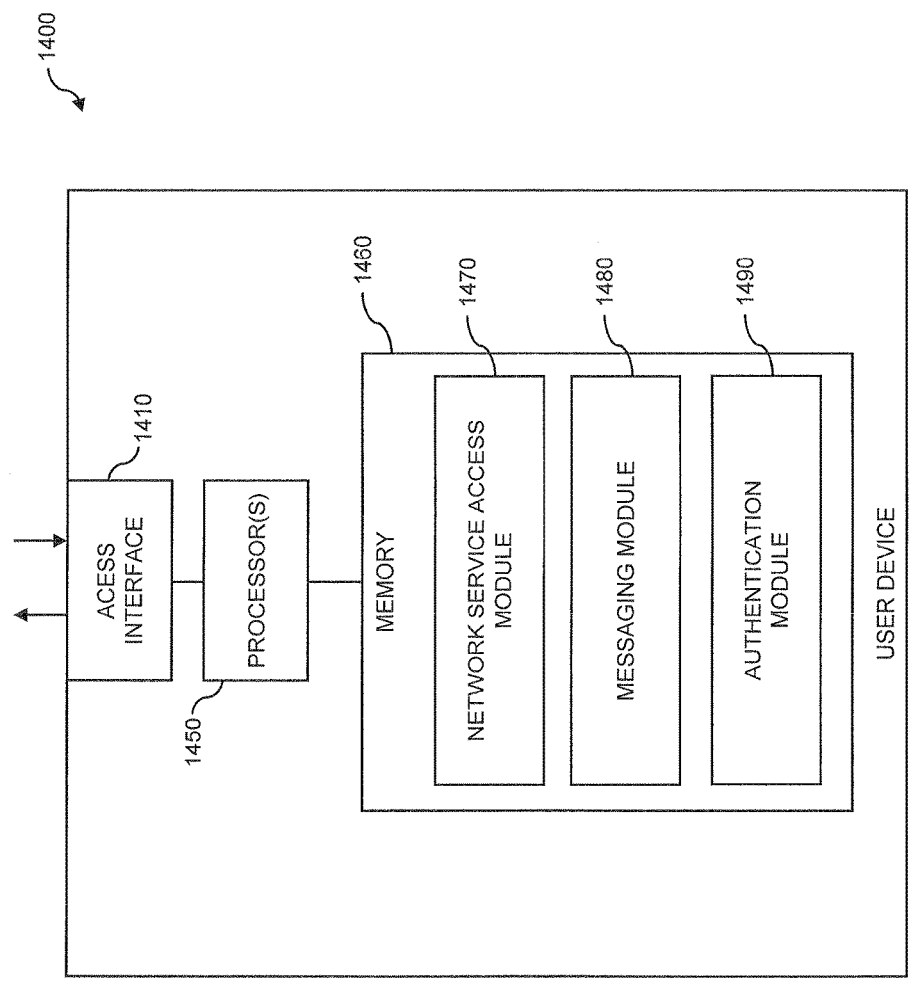
FIG. 14 schematically illustrates structures of a user device according to an embodiment of the invention.

FIG. 14 illustrates exemplary structures which may be used for implementing the above concepts in a user device 1400. For example, the user device 1400 may correspond to a UE for a mobile communication network, such as the UE 10.

As illustrated, the user device 1400 may include an access interface 1410 for accessing the communication network. If the user device 1400 corresponds to a UE for a mobile communication network, the access interface 1410 may correspond to a radio interface. However, other access technologies could be utilized as well, and the access interface 1410 may be configured accordingly. In order to support interaction with an NAF of the GBA technology, the access interface 1410 may also implement the Ua interface of the GBA technology.

Further, the user device 1400 may include one or more processors 1450 coupled to the access interface 1410, and a memory 1460 coupled to the processor(s) 1450. The memory 1460 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 1460 includes suitably configured program code to be executed by the processor(s) 1450 so as to implement the above-described functionalities of a user device. In particular, the memory 1460 may include various program code modules for causing the user device 1400 to perform processes as described above, e.g., corresponding to the method steps of FIG. 8.

As illustrated, the memory 1460 may include a network service access module 1470 for implementing the above-described functionalities of providing a subscriber access to a network service, e.g., as explained in connection with step 810 of FIG. 8. Further, the memory 1460 may include a messaging module 1480 for implementing the above-described functionalities of generating, processing, sending, and receiving messages, such as explained in connection with steps 860, 880 and 890 of FIG. 8. The functionalities of the messaging module 1480 may also include functionalities for determining or generating a charging record, such as explained in connection with step 840 of FIG. 8. Further, the memory 1460 may include an authentication module 1490 for implementing the above-described functionalities related to authentication of a charging record or a message, such as explained in connection with steps 850, 870 of FIG. 8.

It is to be understood that the structures as illustrated in FIG. 14 are merely schematic and that the user device 1400 may actually include further components which, for the sake of clarity, have not been illustrated, e.g., further interfaces or processors. Also, it is to be understood that the memory 1460 may include further types of program code modules, which have not been illustrated, e.g., program code modules for implementing known functionalities of a UE for a mobile communication network. According to some embodiments, also a computer program may be provided for implementing functionalities of the user device 1400, e.g., in the form of a physical medium storing the program code and/or other data to be stored in the memory 1460 or by making the program code available for download or by streaming.

Figure 15:
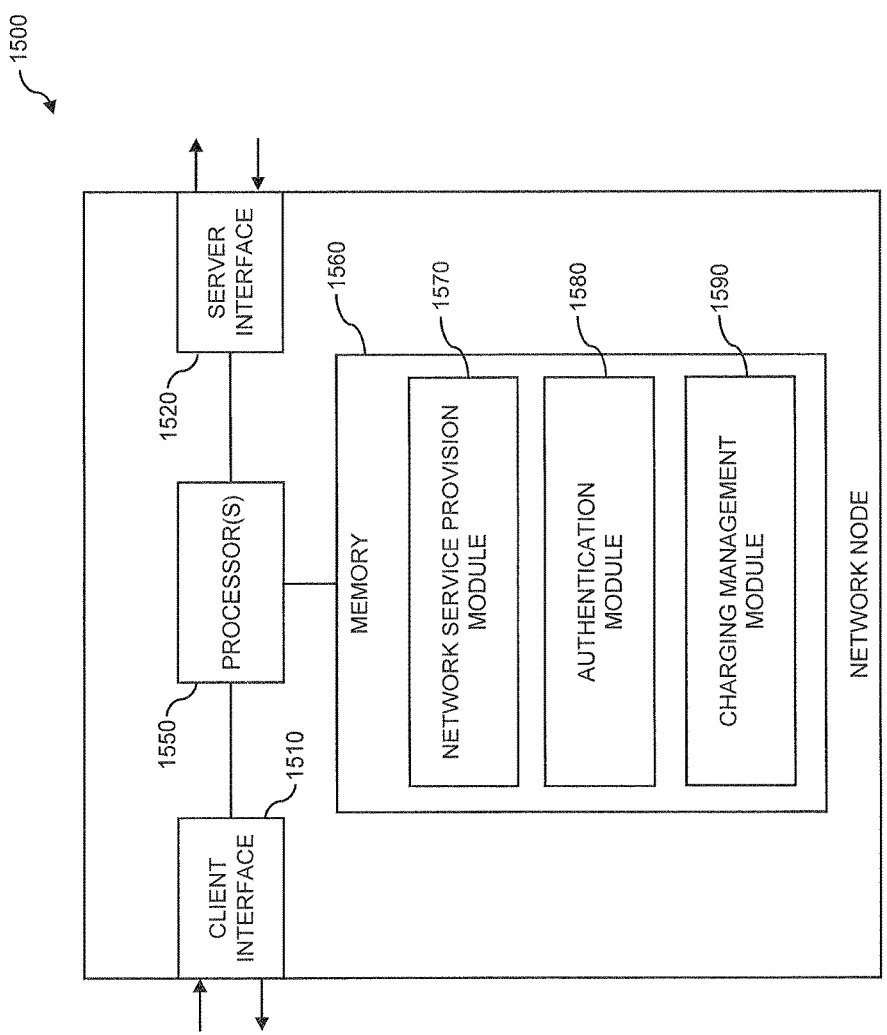
FIG. 15 schematically illustrates structures of a network node according to an embodiment of the invention.

FIG. 15 illustrates exemplary structures which may be used for implementing the above concepts in a network node 1500. For example, the network node 1500 may correspond to an NAF of the GBA technology, such as the NAF 150.

As illustrated, the network node 1500 may include a client interface 1510 for connecting to one or more user devices, such as the UE 10. Further, the network node 1500 may include a server interface 1520 for connecting to an application server providing a network service, such as the application server 160. If the network node 1500 corresponds to an NAF, the client interface 1510 may correspond to the Ua interface.

Further, the network node 1500 may include one or more processors 1550 coupled to the interfaces 1510, 1520, and a memory 1560 coupled to the processor(s) 1550. The memory 1560 may include a ROM, e.g., a flash ROM, a RAM, e.g., a DRAM or SRAM, a mass storage, e.g., a hard disk or solid state disk, or the like. The memory 1560 includes suitably configured program code to be executed by the processor(s) 1550 so as to implement the above-described functionalities of a network node. In particular, the memory 1560 may include various program code modules for causing the network node 1500 to perform processes as described above, e.g., corresponding to the method steps of FIG. 10.

As illustrated, the memory 1560 may include a network service provision module 1570 for implementing the above-described functionalities of providing access to a network service, e.g., as explained in connection with step 1010 of FIG. 10. This may also include processing, receiving, and sending of messages associated with the network service, such as explained in connection with steps 1020, 1045, and 1070 of FIG. 10. Further, the memory 1560 may include an authentication module 1580 for implementing the above-described functionalities related to authentication of messages, such as explained in connection with step 1030 of FIG. 10. Further, the memory 1560 may include a charging management module 1590 for implementing the above-described functionalities of forwarding a charging record, recording such charging record or information therefrom, or receiving and processing acknowledgements with respect to such forwarded charging record, such as explained in connection with steps 1050, 1060, and 1070 of FIG. 10.

It is to be understood that the structures as illustrated in FIG. 15 are merely schematic and that the network node 1500 may actually include further components which, for the sake of clarity, have not been illustrated, e.g., further interfaces or processors. Also, it is to be understood that the memory 1560 may include further types of program code modules, which have not been illustrated, e.g., program code modules for implementing known functionalities of an NAF or similar network node. According to some embodiments, also a computer program may be provided for implementing functionalities of the network node 1500, e.g., in the form of a physical medium storing the program code and/or other data to be stored in the memory 1560 or by making the program code available for download or by streaming.

Figure 16:
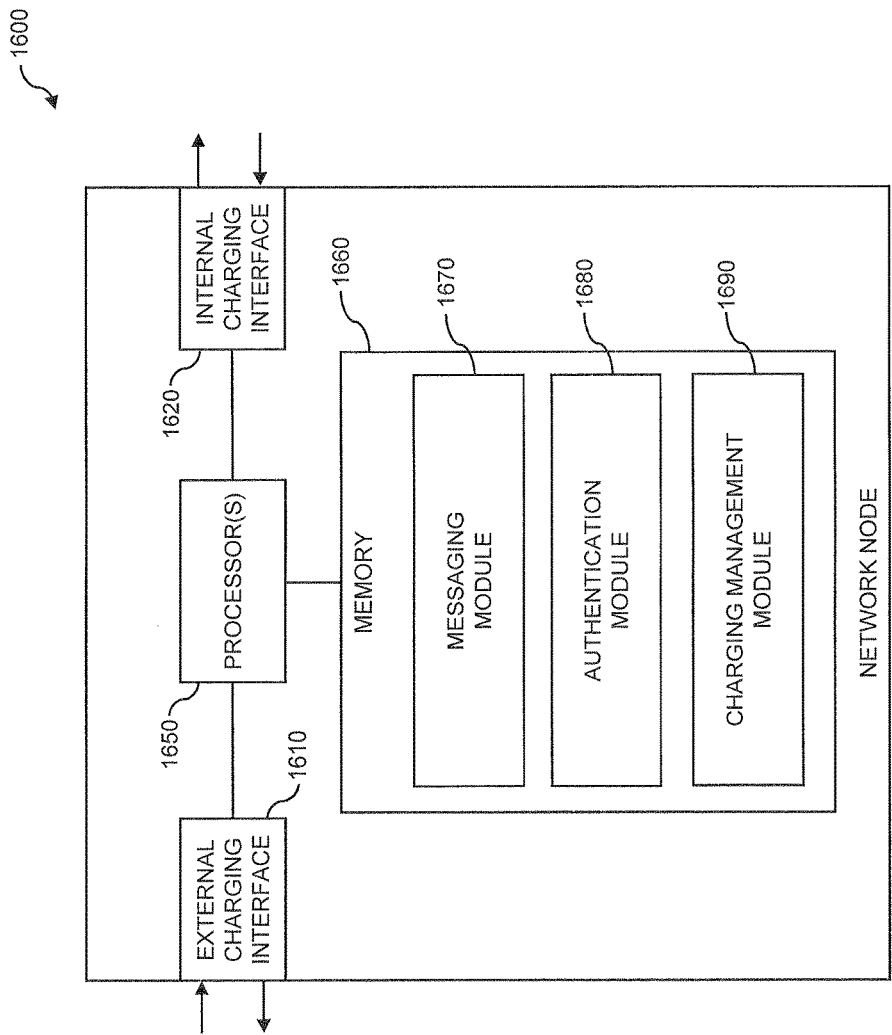
FIG. 16 schematically illustrates structures of a further network node according to an embodiment of the invention.

FIG. 16 illustrates exemplary structures which may be used for implementing the above concepts in a network node 1600. For example, the network node 1600 may correspond to a CRR, such as the CRR 120.

As illustrated, the network node 1600 may include an external charging interface 1610 for connecting to a network node participating in providing a network service, e.g., an NAF of the GBA technology, such as the NAF 150. Further, the network node 1600 may include an internal charging interface 1620 for connecting to a charging system of the communication network, such as the charging system 130. The internal charging interface 1520 may for example based on the above-mentioned Rf or Ro interface.

Further, the network node 1600 may include one or more processors 1650 coupled to the interfaces 1610, 1620, and a memory 1660 coupled to the processor(s) 1650. The memory 1660 may include a ROM, e.g., a flash ROM, a RAM, e.g., a DRAM or SRAM, a mass storage, e.g., a hard disk or solid state disk, or the like. The memory 1660 includes suitably configured program code to be executed by the processor(s) 1650 so as to implement the above-described functionalities of a network node. In particular, the memory 1660 may include various program code modules for causing the network node 1600 to perform processes as described above, e.g., corresponding to the method steps of FIG. 12.

As illustrated, the memory 1660 may include a messaging module 1670 for implementing the above-described functionalities of processing, receiving, and sending of messages, such as explained in connection with steps 1220, 1260, and 1270 of FIG. 12. Further, the memory 1660 may include an authentication module 1680 for implementing the above-described functionalities related to authentication of a charging record, such as explained in connection with step 1230 of FIG. 12. Further, the memory 1660 may include a charging management module 1690 for implementing the above-described functionalities of processing charging records, controlling charging depending on a received charging record, interacting with the charging system, or sending acknowledgements with respect to authentication of a charging record, such as explained in connection with steps 1245, 1250, 1260, and 1270 of FIG. 12.

It is to be understood that the structures as illustrated in FIG. 16 are merely schematic and that the network node 1600 may actually include further components which, for the sake of clarity, have not been illustrated, e.g., further interfaces or processors. Also, it is to be understood that the memory 1660 may include further types of program code modules, which have not been illustrated, e.g., program code modules for implementing known functionalities of a charging related node, such as a CTF or CDF. According to some embodiments, also a computer program may be provided for implementing functionalities of the network node 1600, e.g., in the form of a physical medium storing the program code and/or other data to be stored in the memory 1660 or by making the program code available for download or by streaming.

As can be seen, the concepts as described above may be used for efficiently charging a network service provided in an anonymized manner. More specifically, the illustrated concepts may be used to provide a mechanism by which the service provider of the network service can utilize charging mechanisms of the mobile communication network to charge for the offered network service, while still maintaining privacy of the subscriber with respect to the NAF 150, the application server 160 and thus the service provider. The mechanisms may be implemented in a way to allow for reuse of existing GBA functions, e.g., functions for providing or deriving key material.

It is possible to provide a GBA authenticated network service in an anonymous manner and still charge for the service. Infrastructure an mechanisms of the mobile communication network may be used for performing charging and billing towards the subscriber, and the operator of the mobile communication network may offer this possibility as a service to the service provider of the network service. At the same time, manipulation of the charging records can be prevented through the authentication based on the charging-specific key material.

By involving the NAF in forwarding the charging record the NAF is made aware of the fact that the UE is providing charging data. This information may be used by the NAF, e.g., to decide whether provisioning of the network service should be continued by the NAF. If the charging record is not encrypted, but only authenticated, the NAF can also verify the correctness of the charging data included in the charging record. Further, by involving the NAF in the charging procedure, the NAF can keep a record of a total amount of charges incurred for the operator of the mobile communication network and thus provide information which can be used as a basis for determining a reward to be paid by the operator to the service provider.

It is to be understood that the examples and embodiments as explained above are merely illustrative and susceptible to various modifications. For example, the illustrated concepts may be applied in connection with various network technologies, without limitation to mobile communication networks or mobile communication networks as specified by 3GPP. Further, the illustrated concepts may be applied in connection with various kinds of authentication mechanisms and network services. Moreover, it is to be understood that the above concepts may be implemented by using correspondingly designed software to be executed by one or more processors of an existing device, or by using dedicated device hardware.

The invention claimed is:

1. A method of controlling utilization of a network service, the method comprising a user device:
   providing a subscriber with access to a network service;
   determining service-specific key material;
   determining charging-specific key material;
   determining a charging record indicating usage of the network service by the subscriber;
   associating the charging record with first authentication information based on the charging-specific key material;
   generating at least one message comprising the charging record and the associated first authentication information;
   associating the at least one message with second authentication information based on the service-specific key material; and
   sending the at least one message and the associated second authentication information to a network node which is incapable of relating any of the service-specific key material and the charging-specific key material to a subscriber identity of the subscriber.

2. The method of claim 1, further comprising the user device deriving the charging-specific key material:
   from the subscriber identity; or
   from the subscriber identity and the service-specific key material.

3. The method of claim 1, further comprising the user device receiving a response from the network node, the response indicating that usage of the network service by the subscriber is authorized.

4. The method of claim 1, further comprising the user device:
   determining generic key material through interaction with another network node; and
   deriving the charging-specific key material and/or the service-specific key material from the generic key material.

5. A method of controlling utilization of a network service, the method comprising a network node:
   providing access to a network service through a user device connected to the network node;
   receiving, from the user device, at least one message and first authentication information associated with the at least one message, the first authentication information being based on service-specific key material, the at least one message comprising a charging record and second authentication information associated with the charging record, the charging record indicating usage of the network service by a subscriber, the second authentication information being based on charging-specific key material; wherein the network node is incapable of relating any of the service-specific key material and the charging-specific key material to a subscriber identity of the subscriber;
   authenticating the at least one message based on the service-specific key material and the first authentication information; and
   in response to authenticating the at least one message, forwarding the charging record and the associated second authentication information to a further network node which is capable of relating the charging-specific key material to a subscriber identity of the subscriber.

6. The method of claim 5, wherein the charging-specific key material is derived:
   from the subscriber identity;
   from the subscriber identity and the service-specific key material.

7. The method of claim 5, further comprising the network node receiving the service-specific key material from another network node.

8. The method of claim 5, further comprising the network node receiving a response from the further network node, the response indicating whether the charging record was authenticated by the further network node.

9. A method of controlling utilization of a network service, the method comprising a network node:
   determining charging-specific key material related to a subscriber identity of a subscriber;
   receiving, from a further network node, a charging record and authentication information associated with the charging record, the charging record indicating usage of a network service by the subscriber and being based on the charging-specific key material; wherein the further network node is incapable of relating the charging-specific key material to the subscriber identity of the subscriber;
   authenticating the charging record based on the charging-specific key material and the associated authentication information; and
   controlling, in response to authenticating the charging record, charging of the network service.

10. The method of claim 9, further comprising the network node deriving the charging-specific key material from the subscriber identity.

11. The method of claim 9, further comprising the network node:
   receiving service-specific key material from another network node; and
   deriving the charging-specific key material from the subscriber identity and the service-specific key material.

12. The method of claim 9, further comprising the network node sending a response to the further network node, the response indicating:
   whether the charging record was authenticated by the network node; or
   whether charging of the network service is authorized for the subscriber.

13. A user device, the user device comprising:
   processing circuitry;
   memory containing instructions executable by the processing circuitry whereby the user device is operative to:
      provide a subscriber with access to a network service;
      determine service-specific key material;
      determine charging-specific key material;
      determine a charging record indicating usage of the network service by the subscriber;
      associate the charging record with first authentication information based on the charging-specific key material;
      generate at least one message comprising the charging record and the associated first authentication information;
      associate the at least one message with second authentication information based on the service-specific key material; and
      send the at least one message and the associated second authentication information to a network node which is incapable of relating any of the charging-specific key material and the service-specific key material to a subscriber identity of the subscriber.

14. The user device of claim 13, wherein the instructions are such that the user device is operative to derive the charging-specific key material from the subscriber identity.

15. The user device of claim 13, wherein the instructions are such that the user device is operative to receive a response from the network node, the response indicating that usage of the network service by the subscriber is authorized.

16. The user device of claim 13, wherein the instructions are such that the user device is operative to:
   determine generic key material through interaction with another network node; and
   derive the charging-specific key material and/or the service-specific key material from the generic key material.

17. The user device of claim 13, wherein the at least one message includes an identifier associated with the charging-specific key material and the service-specific key material.

18. A network node, the network node, comprising:
   processing circuitry;
   memory containing instructions executable by the processing circuitry whereby the network node is operative to:
      provide access to a network service through a user device connected to the network node;
      receive, from the user device, a at least one message and first authentication information associated with the at least one message, the first authentication information being based on service-specific key material, the at least one message comprising a charging record and second authentication information associated with the charging record, the charging record indicating usage of the network service by a subscriber, the second authentication information being based on charging-specific key material, wherein the network node is incapable of relating any of the charging-specific key material and the service-specific key material to a subscriber identity of the subscriber;
      authenticate of the at least one message based on the service-specific key material and the first authentication information; and
      forward, in response to authenticating the at least one message, the charging record and the associated second authentication information to a further network node which is capable of relating the charging-specific key material to the subscriber identity of the subscriber.

19. The network node of claim 18, wherein the instructions are such that the network node is operative to derive the charging-specific key material from the subscriber identity.

20. The network node of claim 18, wherein the instructions are such that the network node is operative to receive the service-specific key material from another network node.

21. The network node of claim 18, wherein the instructions are such that the network node is operative to receive a response from the further network node, the response indicating:
   whether the charging record was authenticated by the further network node; or
   whether charging of the network service is authorized for the subscriber.

22. A network node, the network node comprising:
   processing circuitry;
   memory containing instructions executable by the processing circuitry whereby the network node is operative to:
      determine charging-specific key material related to a subscriber identity of a subscriber;
      receive, from a further network node, a charging record and authentication information associated with the charging record, the charging record indicating usage of a network service by a subscriber, the authentication information being based on the charging-specific key material; wherein the further network node is incapable of relating the charging-specific key material to the subscriber identity of the subscriber;
      authenticate the charging record based on the charging-specific key material and the associated authentication information; and
      control charging of the network service in response to authenticating the charging record.

23. The network node of claim 22, wherein the instructions are such that the network node is operative to derive the charging-specific key material from the subscriber identity.

24. The network node of claim 23, wherein the instructions are such that the network node is operative to:
   receive service-specific key material from another network node; and
   derive the charging-specific key material from the subscriber identity and the service-specific key material.

25. The network node of claim 24, wherein the instructions are such that the network node is operative to:
   receive the charging record in a message which further includes an identifier; and
   receive the service-specific key material based on the identifier.

26. The network node of claim 22, wherein the instructions are such that the network node is operative to send a response to the further network node, the response indicating:
   whether the charging record was authenticated by the network node;
   whether charging of the network service is authorized for the subscriber.

* * * * *

UNITED STATES PATENT AND TRADEMARK OFFICE
CERTIFICATE OF CORRECTION

PATENT NO. : 10,194,033 B2  
APPLICATION NO. : 15/774023  
DATED : January 29, 2019  
INVENTOR(S) : Thomas Weidenfeller Page 1 of 1

It is certified that error appears in the above-identified patent and that said Letters Patent is hereby corrected as shown below:

In the Drawings

In Fig. 12, Sheet 12 of 16, delete "step 1045" and insert -- step 1245 --, therefor.

In the Specification

In Column 1, Line 59, delete "he UE" and insert -- the UE --, therefor.

In Column 2, Line 54, delete "service provide" and insert -- service provider --, therefor.

In Column 14, Line 1, delete "uses the be" and insert -- uses the --, therefor.

In Column 20, Line 44, delete "service provide" and insert -- service provider --, therefor.

In Column 30, Line 13, delete "internal charging interface 1520" and insert -- internal charging interface 1620 --, therefor.

Signed and Sealed this  
Third Day of September, 2019

Andrei Iancu  
*Director of the United States Patent and Trademark Office*